(12) United States Patent
Yamada

(10) Patent No.: US 9,649,936 B2
(45) Date of Patent: May 16, 2017

(54) IN-VEHICLE DEVICE, CONTROL METHOD OF IN-VEHICLE DEVICE, AND COMPUTER-READABLE STORAGE MEDIUM

(71) Applicant: TOYOTA JIDOSHA KABUSHIKI KAISHA, Toyota-shi, Aichi-ken (JP)

(72) Inventor: Yoshinori Yamada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 14/829,290

(22) Filed: Aug. 18, 2015

(65) Prior Publication Data

US 2016/0052394 A1 Feb. 25, 2016

(30) Foreign Application Priority Data

Aug. 22, 2014 (JP) ................. 2014-169499

(51) Int. Cl.
*B60K 37/04* (2006.01)
*B60W 50/14* (2012.01)
(Continued)

(52) U.S. Cl.
CPC ............ *B60K 37/04* (2013.01); *B60W 30/16* (2013.01); *B60W 50/14* (2013.01); *G01C 21/365* (2013.01); *G06T 19/006* (2013.01); *G09G 5/38* (2013.01); *B60K 2350/2052* (2013.01); *B60K 2350/901* (2013.01); *B60K 2350/905* (2013.01); *B60K 2350/965* (2013.01); *B60R 2300/205* (2013.01); *B60R 2300/308* (2013.01); *G09G 2380/10* (2013.01)

(58) Field of Classification Search
CPC B60K 37/04; B60K 2350/965; G06T 19/006; G01C 21/365; G01C 21/3697; G09G 2380/10; B60W 30/16; B60W 30/165; B60W 50/14; B60W 2050/146; B60R 2300/205; B60R 2300/308
See application file for complete search history.

(56) References Cited

U.S. PATENT DOCUMENTS

2013/0027426 A1  1/2013  Sasaki et al.
2013/0179023 A1  7/2013  Schmidt
(Continued)

FOREIGN PATENT DOCUMENTS

CN  103171439 A  6/2013
CN  103217169 A  7/2013
(Continued)

*Primary Examiner* — Spencer Patton
(74) *Attorney, Agent, or Firm* — Oliff PLC

(57) ABSTRACT

An in-vehicle device includes: a drive assist unit configured to perform drive assist processing; a display unit configured to display an image in a display area with the image overlapped on a scene in a real space ahead of a vehicle; and a display control unit configured to control the display unit to display, in a normal state while the drive assist processing is performed, an image of a first marker at a vehicle-corresponding position as a position in the display area corresponding to a position where the vehicle is estimated to be positioned in the real space in a predetermined time. The first marker has a first color, the first marker has a first shape that has a smooth outline and fluctuates, and a display position of the first marker varies periodically from the vehicle-corresponding position.

18 Claims, 29 Drawing Sheets

(51) Int. Cl.
    *G01C 21/36*     (2006.01)
    *B60W 30/16*     (2012.01)
    *G06T 19/00*     (2011.01)
    *G09G 5/38*     (2006.01)

(56) References Cited

U.S. PATENT DOCUMENTS

| | | |
|---|---|---|
| 2013/0188258 A1 | 7/2013 | Mathieu et al. |
| 2013/0289875 A1 | 10/2013 | Kumon |
| 2014/0222277 A1 | 8/2014 | Tsimhoni et al. |

FOREIGN PATENT DOCUMENTS

| | | |
|---|---|---|
| GB | 2498035 A | 7/2013 |
| JP | 2003-291688 A | 10/2003 |
| JP | 2005-067514 A | 3/2005 |
| JP | 2006-284458 A | 10/2006 |
| JP | 2010-228471 | 10/2010 |
| JP | 2014-010800 A | 1/2014 |
| WO | 2011/099431 A1 | 8/2011 |
| WO | 2012/090325 A1 | 7/2012 |

IN-VEHICLE DEVICE, CONTROL METHOD OF IN-VEHICLE DEVICE, AND COMPUTER-READABLE STORAGE MEDIUM

INCORPORATION BY REFERENCE

The disclosure of Japanese Patent Application No. 2014-169499 filed on Aug. 22, 2014 including the specification, drawings and abstract is incorporated herein by reference in its entirety.

BACKGROUND OF THE INVENTION

1. Field of the Invention

The present invention relates to an in-vehicle device, a control method of the in-vehicle device, and a computer-readable storage medium.

2. Description of the Related Art

As a vehicle drive assist technology, Japanese Patent Application Publication No. 2014-010800 (JP 2014-010800 A) describes an in-vehicle system that superimposes a preceding marker, which indicates the traveling direction of the vehicle, on the scene in the real space using a head-up display. When an obstacle that may collide with the vehicle is detected ahead of the vehicle, this in-vehicle system gradually increases the size of the preceding marker while serially changing the display position of the preceding marker from a position, which corresponds to a position ahead of and at an intermediate distance from the vehicle, to a position, which corresponds to a position ahead of and near to the vehicle, as the time elapses (or, indicates the situation in which the preceding marker is approaching the vehicle from the position ahead of the vehicle, using the preceding marker).

The in-vehicle system described in Japanese Patent Application Publication No. 2014-010800 (JP 2014-010800 A) calculates a forward direction safety level and, when the calculated forward direction safety level is "high" or "intermediate", displays the preceding marker at the position and in the size corresponding to the calculated forward direction safety level. This means that, according to the in-vehicle system described in Japanese Patent Application Publication No. 2014-010800 (JP 2014-010800 A), the display position and the display size of the preceding marker are not changed while the forward direction safety level is not changed.

As the vehicle drive assist technology advances, there may be a case in which an occupant of the vehicle allows the vehicle drive assist device to drive the vehicle. In such a case, if the display position and the display size of the preceding marker are not changed while the forward direction safety level is not changed, the occupant may feel uneasy that he or she cannot confirm that vehicle automatic drive is being operated normally. In addition, the monotonous display, in which the display position and the display size of the preceding marker are not changed while the forward direction safety level is not changed, may lead to a possibility that the occupant pays less attention to the vehicle automatic drive.

SUMMARY OF THE INVENTION

The present invention provides an in-vehicle device, a control method of the in-vehicle device, and a computer-readable storage medium that can give an occupant a sense of safety and reduce occupant distraction from driving even when the occupant allows the driving assist unit or the driving assist processing to drive the vehicle.

A first aspect of the invention relates to an in-vehicle device including: a drive assist unit configured to perform drive assist processing that assists an occupant in driving a vehicle; a display unit configured to display an image in a display area with the image overlapped on a scene in a real space ahead of the vehicle; and a display control unit configured to control the display unit to display, in a normal state while the drive assist processing is performed by the drive assist unit, an image of a first marker at a vehicle-corresponding position as a position in the display area corresponding to a position where the vehicle is estimated to be positioned in the real space in a predetermined time. The first marker has a first color, the first marker has a first shape that has a smooth outline and fluctuates, and a display position of the first marker varies periodically from the vehicle-corresponding position.

According to the configuration described above, the first marker is displayed at a position around the vehicle-corresponding position in a normal state while the drive assist processing by the drive assist unit. This first marker has a first color and has a first shape that has a smooth outline and that fluctuates, and the display position varies periodically from the vehicle-corresponding position. Therefore, the first marker shows an animated motion (behavior) in the normal state. This allows the occupant, who visually recognizes the motion of the first marker, to visually and easily understand that the automatic drive processing is performed by the drive assist unit normally and, at the same time, to visually and easily understand the direction in which the vehicle is to travel, thus giving the occupant a sense of safety. In addition, the animated motion (behavior) of the first marker gives the occupant a sense of reliance on, and a sense of affinity to, the first marker and, at the same time, reduces the possibility that the driver is distracted from the automatic drive control processing performed by the automatic drive control unit.

The display control unit may be configured to control the display unit to display an image of a second marker when there is a need to issue an alert to the occupant. The second marker may have a second color that differs from the first color, the second marker may have a second shape that differs from the first shape, and a display position of the second marker may move from the vehicle-corresponding position to a position in the display area corresponding to a location where an attention of the occupant is required, at a speed higher than a speed at which the display position of the first marker varies.

According to the configuration described above, the second marker is displayed when there is a need to issue an alert to the occupant. This second marker has a second color that differs from the first color and has a second shape that differs from the first shape, and the display position moves from the vehicle-corresponding position to a position in the display area corresponding to a location where an attention of the occupant is required, at a speed higher than a speed at which the display position of the first marker varies. Therefore, if there is a need to issue an alert to the occupant while the drive assist processing is performed by the drive assist unit, the displayed marker is changed from the first marker to the second marker, with the result that the color, shape, and display position of the marker, as well as the speed of movement to the display position, are changed. Based on these changes, the occupant can intuitively understand the situation. In addition, the ability to alert the occupant through the change in marker's color, shape, and display position, as well as in the speed of movement to the display position, can lead to a reduction in an excessive load on the driver that might otherwise be generated by an excessive display change that results in annoying the driver or by an excessive display change that results in transmitting too much information to the driver.

The second shape may have an outline composed of a plurality of acute projections. In this case, the shape of the second marker can strongly alerts the occupant so that the occupant will intuitively understand the situation.

The display control unit may be configured to control the display unit to display an image of a third marker when a failure is occurred in the drive assist unit or in the drive assist processing performed by the drive assist unit. The third marker may have a third color that differs from the first color and the second color, and the third marker may have a third shape that differs from the first shape and the second shape and that changes indeterminately.

According to the configuration described above, if a failure is occurred in the drive assist unit or the drive assist processing while the drive assist processing is performed by the drive assist unit, the image of the third marker is displayed. The third marker has a third color that differs from the first color and the second color, and has a third shape that differs from the first shape and the second shape and that changes indeterminately. Therefore, the color and the shape of the third marker and the change in the shape allow the occupant to intuitively recognize that a failure is occurred in the drive assist unit or in the drive assist processing and therefore an attention is required.

The display control unit may be configured to control the display unit to display a message indicating termination of the drive assist processing and erase the display of the third marker, when a type of the occurred failure is a predetermined type.

According to the configuration described above, when the type of the occurred failure is a predetermined type, a message indicating termination of drive assist processing is displayed and the display of the third marker is erased. This allows the occupant to recognize that the occurred failure is a failure that makes it difficult to continue the drive assist processing and therefore the drive assist processing will be terminated.

The display control unit may be configured to control the display unit to display, while the vehicle is traveling, a track mark that indicates a movement track of the first marker, the second marker, or the third marker.

According to the configuration described above, the track mark that indicates the movement track of the displayed marker is displayed while the vehicle is traveling. This track mark allows the occupant, who visually recognizes the track mark, to recognize as if the displayed mark was moving with the vehicle in the real space.

The display control unit may be configured to control the display unit to display, as the track mark, a plurality of marks arranged in such a manner that the marks are continuously flowing from the first marker, the second marker, or the third marker, into an area in the display area corresponding to a road surface in the real space. In this case, the occupant's attention can be directed to an area, where the plurality of marks is flowing as the track mark, or to an area near to the track mark.

The display control unit may be configured to control the display unit to display an alert mark that alerts the occupant, when a simple alert is issued to the occupant or a message to the occupant is displayed. According to the configuration described above, when a simple alert is issued to the occupant or a message to the occupant is displayed, the alert mark is displayed to alert the occupant. This alert mark allows the occupant, who visually recognizes it, to pay attention to the drive assist processing performed by the drive assist unit.

The display control unit may be configured to control the display unit to display, as the alert mark, a plurality of marks arranged in such a manner that the marks are scattered from a predetermined position into a surrounding area of the predetermined position. According to the configuration described above, the occupant's attention can be directed to a predetermined position, where the plurality of marks is scattered as the alert mark, or to an area near to that position.

The drive assist unit may be configured to perform, as the drive assist processing, vehicle-following processing in which the vehicle is controlled to follow a specific vehicle that is traveling ahead of the vehicle in the same direction as a direction of the vehicle. In this case, the display control unit may be configured to control the display unit to display, while the vehicle-following processing is performed by the drive assist unit, a following-target vehicle mark indicating that the specific vehicle is a following target vehicle at a position in the display area corresponding to a position of the specific vehicle in the real space.

According to the configuration described above, while the vehicle-following processing during which the vehicle follows a specific vehicle is performed, the following-target vehicle mark is displayed at a position in the display area, corresponding to the position of the specific vehicle in the real space, to allow the occupant to recognize which vehicle is a following target vehicle.

The display control unit may be configured to control the display unit to display, when the vehicle makes one of a lane change and a right or left turn, a direction mark indicating a direction in which the vehicle is to make the one of the lane change and the right or left turn.

According to the configuration described above, the direction mark, which is displayed when the vehicle makes a lane change or a right or left turn, allows the occupant to recognize in advance the direction in which the vehicle is to make a lane change or a right or left turn.

The in-vehicle device may further include a surrounding situation acquisition unit configured to acquire a surrounding situation around the vehicle. The display control unit may control the display unit to display a surrounding situation diagram that indicates the surrounding situation around the vehicle based on the surrounding situation around the vehicle, acquired by the surrounding situation acquisition unit.

According to the configuration described above, the displayed surrounding situation diagram allows the occupant to recognize the vehicle's surrounding situation including a range of a blind spot from the vehicle.

A second aspect of the invention relates to a control method for an in-vehicle device including a drive assist unit configured to perform drive assist processing that assists an occupant in driving a vehicle and a display unit configured to display an image in a display area with the image overlapped on a scene in a real space ahead of the vehicle. The control method includes controlling the display unit to display, in a normal state while the drive assist processing is performed by the drive assist unit, an image of a first marker at a vehicle-corresponding position as a position in the display area corresponding to a position where the vehicle is estimated to be positioned in the real space in a predetermined time. The first marker has a first color, the first marker has a first shape that has a smooth outline and fluctuates, and a display position of the first marker varies periodically from the vehicle-corresponding position. The configuration described above gives the occupant a sense of safety and reduces the possibility that the driver is distracted as in the first aspect.

A third aspect of the invention relates to a non-transitory computer-readable storage medium that stores computer-executable instructions for performing a control method for an in-vehicle device including a drive assist unit configured to perform drive assist processing that assists an occupant in driving a vehicle and a display unit configured to display an image in a display area with the image overlapped on a scene in a real space ahead of the vehicle. The control method includes controlling the display unit to display, in a normal state while the drive assist processing is performed by the drive assist unit, an image of a first marker at a vehicle-corresponding position as a position in the display area corresponding to a position where the vehicle is estimated to be positioned in the real space in a predetermined time. The first marker has a first color, the first marker has a first shape that has a smooth outline and fluctuates, and a display position of the first marker varies periodically from the vehicle-corresponding position. The configuration described above gives the occupant a sense of safety and reduces the possibility that the driver is distracted as in the first and second aspects.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flowchart showing the contents of the information display processing when automatic drive is on;

DETAILED DESCRIPTION OF EMBODIMENTS

Figure 1:
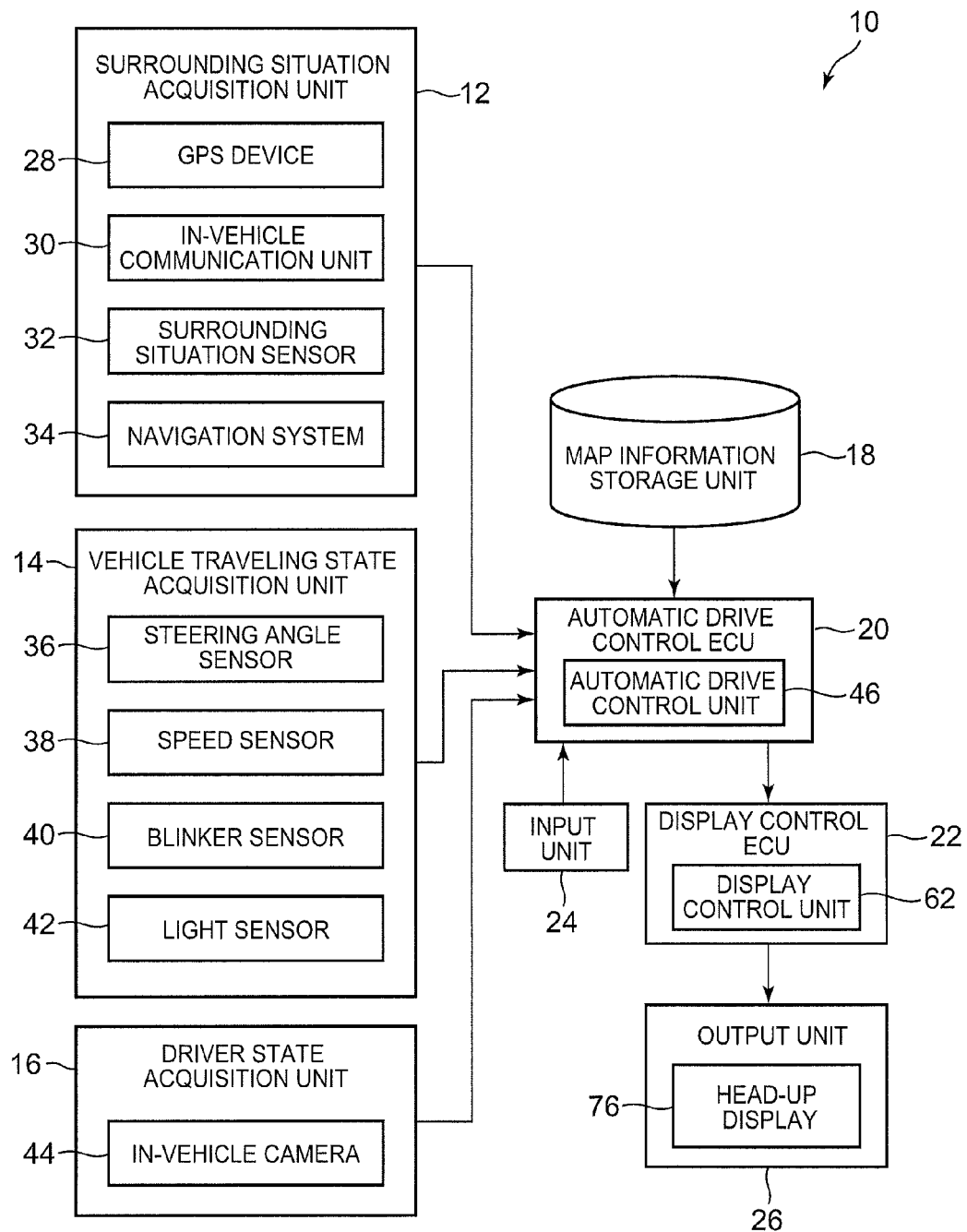
FIG. 1 is a block diagram showing a general configuration of an automatic drive control apparatus mounted on a vehicle.

An example of an embodiment of the present invention is described in detail below with reference to the drawings. FIG. 1 shows an automatic drive control apparatus 10 in this embodiment. The automatic drive control apparatus 10 is an example of the in-vehicle device according to the present invention.

The automatic drive control apparatus 10, mounted on a vehicle, is an apparatus that performs the automatic drive control processing as the drive assist processing that assists an occupant (driver) in driving the vehicle. The automatic drive control processing allows the vehicle (host vehicle), on which the automatic drive control apparatus 10 is mounted, to travel without the driver's driving operation. As shown in FIG. 1, the automatic drive control apparatus 10 includes a surrounding situation acquisition unit 12, a vehicle traveling state acquisition unit 14, a driver state acquisition unit 16, a map information storage unit 18, an automatic drive control ECU 20, a display control ECU 22, an input unit 24, and an output unit 26.

The surrounding situation acquisition unit 12, a functional unit that acquires information indicating the surrounding situation around the vehicle (the vehicle's surrounding situation), includes a GPS (Global Positioning System) device 28, an in-vehicle communication unit 30, a surrounding situation sensor 32, and a navigation system 34. The GPS device 28 receives GPS signals from a plurality of GPS satellites to measure the vehicle's position. The more the number of receivable GPS signals is, the higher the measurement accuracy of the GPS device 28 is. The in-vehicle communication unit 30 is a communication device that carries out at least one of the vehicle-vehicle communication between the vehicle and another vehicle and the road-vehicle communication between the vehicle and a roadside unit. The surrounding situation sensor 32, which includes at least one of a millimeter wave radar and a ultrasonic wave sonar, detects the position and the movement speed of an object around the vehicle such as a vehicle, pedestrian, store, and obstacle. The navigation system 34 displays the vehicle's position on the map and/or guides the vehicle to a destination, based on the map information and the position information obtained from the GPS device 28.

Several specific examples of sensors for recognizing the surrounding environment of the vehicle are given above. In addition to those given above, various sensors, such as an in-vehicle camera, may also be used as a sensor for recognizing the surrounding environment of the vehicle.

The vehicle traveling state acquisition unit 14 acquires information indicating the traveling state and the operation state of the vehicle. The vehicle traveling state acquisition unit 14 includes a steering angle sensor 36, a speed sensor 38, a blinker sensor 40, and a light sensor 42. The steering angle sensor 36 is a sensor that detects the steering angle of the vehicle, and the speed sensor 38 is a sensor that detects the traveling speed of the vehicle. The blinker sensor 40 is a sensor that detects the direction indicated by the direction indicator of the vehicle, and the light sensor 42 is a sensor that detects the on/off state of the lights of the vehicle. In addition to those described above, another sensor may be used to detect at least one of the brake pedal force, gear position, and wiper operation state.

The driver state acquisition unit 16 acquires the information indicating the driver state. The driver state is a state indicating whether the driver is drowsy, inattentive, excited, or calm. The driver state acquisition unit 16, which includes an in-vehicle camera 44, detects bi-information including at least one of driver's line of sight, face direction, movement of the eyes, and movement of the face through image recognition and, based on the detected bio-information, detect the driver state. In addition to the in-vehicle camera 44, a directional microphone that acquires sounds in the vehicle, a biosensor provided on the steering wheel, or a brain wave sensor may be used to detect the driver state.

Figure 2A:
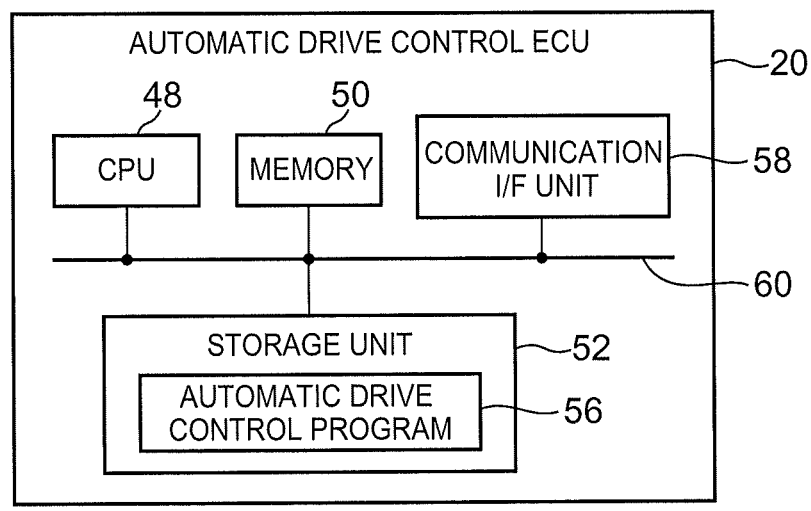
FIG. 2A is a block diagram showing a general configuration of an automatic drive control ECU and FIG. 2B is a block diagram showing a general configuration of a display control ECU.

The automatic drive control ECU 20 includes an automatic drive control unit 46 performs the automatic drive control processing that allows the vehicle to travel automatically. As shown in FIG. 2A, the automatic drive control ECU 20 includes a CPU 48, a memory 50, a nonvolatile storage unit (storage medium) 52 that stores an automatic drive control program 56, and a communication interface (I/F) unit 58 that carries out communication with the sensors and actuators. These components are interconnected via a bus 60. The automatic drive control ECU 20 functions as the automatic drive control unit 46 when the automatic drive control program 56 is read from the storage unit 52 for expansion into the memory 50 and the automatic drive control program 56, expanded in the memory 50, is executed by the CPU 48.

To allow the vehicle to travel automatically, the automatic drive control unit 46 determines the situation of the vehicle and its surroundings based on the information obtained from the sensors and performs the automatic drive control processing for controlling the accelerator amount, brake amount, and steering angle amount. In this embodiment, the automatic drive control unit 46, which determines the situation of the vehicle and its surroundings, determines whether the state of the vehicle and its surroundings is the "good state", "hazard state", or "failure state (a failure is occurred in the vehicle)". When the situation of the vehicle and its surroundings is the "hazard state", the automatic drive control unit 46 also determines the hazard level. Because the automatic drive control processing by the automatic drive control unit 46 can be implemented by a known technology, its detailed description is omitted. The automatic drive control unit 46 is an example of the drive assist unit.

Figure 2B:
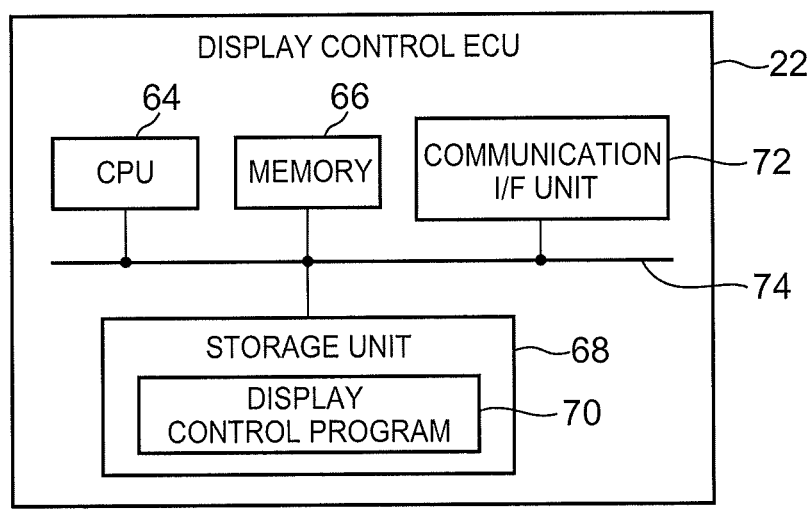

On the other hand, the display control ECU 22 includes a display control unit 62, as shown in FIG. 1, for controlling image display on a HUD 76 that will be described later. As shown in FIG. 2B, the display control ECU 22 includes a CPU 64, a memory 66, a nonvolatile storage unit 68 that stores a display control program 70, and a communication interface (I/F) unit 72 that carries out communication with an external device. These components are interconnected via a bus 74. The display control ECU 22 functions as the display control unit 62 when the display control program 70 is read from the storage unit 68 for expansion into the memory 66 and the display control program 70, expanded in the memory 66, is executed by the CPU 64.

The display control program 70 is an example of the control program of the in-vehicle device according, and the display control unit 62 is an example of the display control unit. The display control ECU 22 is an example of a computer that executes the instructions for performing the control method of the in-vehicle device.

The input unit 24, used by the driver to enter information into the automatic drive control ECU 20, includes at least one of a button, a switch, and a touch screen. The driver enters an automatic drive start instruction and an automatic drive termination instruction into the automatic drive control ECU 20 via the input unit 24.

Figure 3:
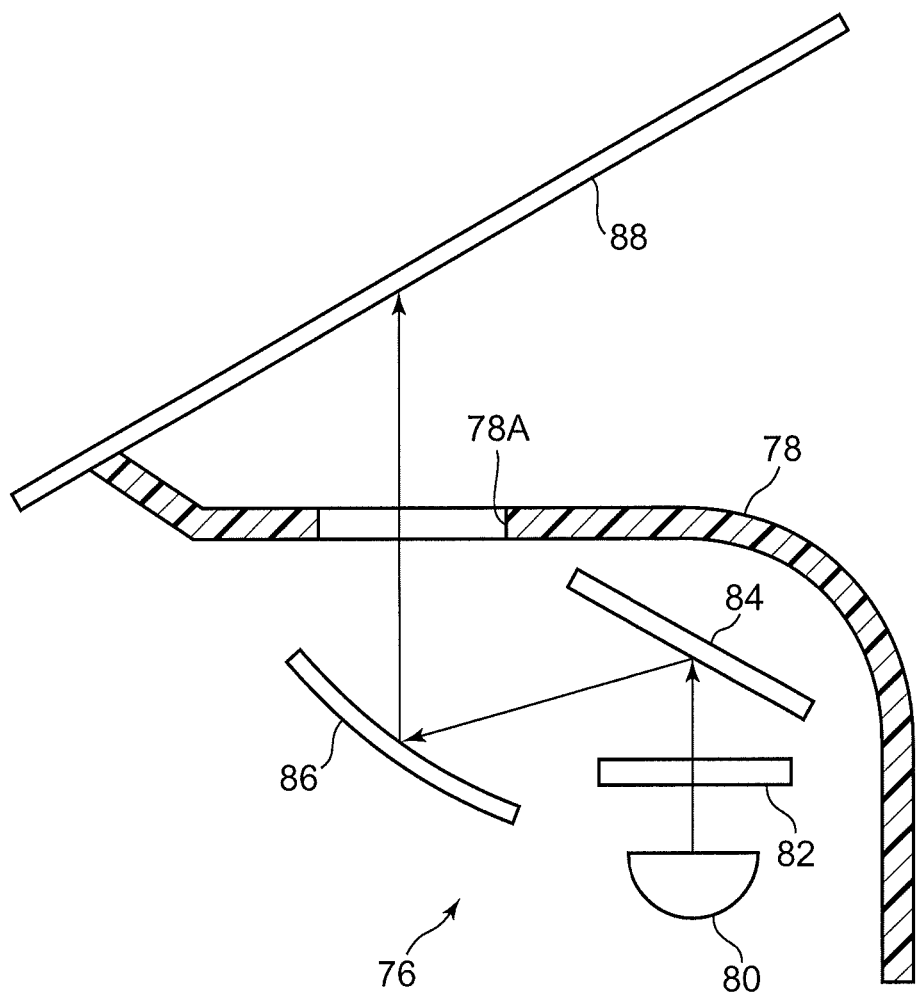
FIG. 3 is a cross section diagram showing a general configuration of a head-up display (HUD)

The output unit 26 includes a head-up display 76 (hereinafter called an HUD 76) for presenting information from the automatic drive control ECU 20 to the driver. As shown in FIG. 3, the HUD 76, built in an instrument panel 78 of the vehicle, includes a light source 80, a liquid crystal panel 82 through which the light emitted from the light source 80 transmits, a flat mirror 84 that reflects the light that has transmitted through the liquid crystal panel 82, and a concave mirror 86 that reflects the light, reflected by the flat mirror 84, into the direction of a front windshield glass 88 of the vehicle.

The HUD 76 receives a specified image to be displayed on the front windshield glass 88 from the display control ECU 22 and controls the driving of the liquid crystal panel 82 according to the specified image. The light that transmits through the liquid crystal panel 82 is reflected by the flat mirror 84 and the concave mirror 86, and then the light that is reflected by the concave mirror 86 is projected on the front windshield glass 88 via the opening 78A on the instrument panel 78. In this manner, the image specified by the display control ECU 22 is enlarged and projected (displayed) on the front windshield glass 88.

In this way, the HUD 76, an example of the display unit, can display an image on the front windshield glass 88, which functions as an display area, in a manner in which the image is superimposed on the scene in the real space ahead of the vehicle. The configuration of the HUD 76 is not limited to the one shown in FIG. 3 but may be another known configuration of the HUD 76.

Next, the operation of this embodiment is described below with reference to the flowcharts shown in FIG. 4 to FIG. 7. In the operation of this embodiment, the display control processing is performed by the display control unit 62 (display control ECU 22) while the ignition switch of a vehicle, on which the automatic drive control apparatus 10 is mounted, is on.

Figure 4:
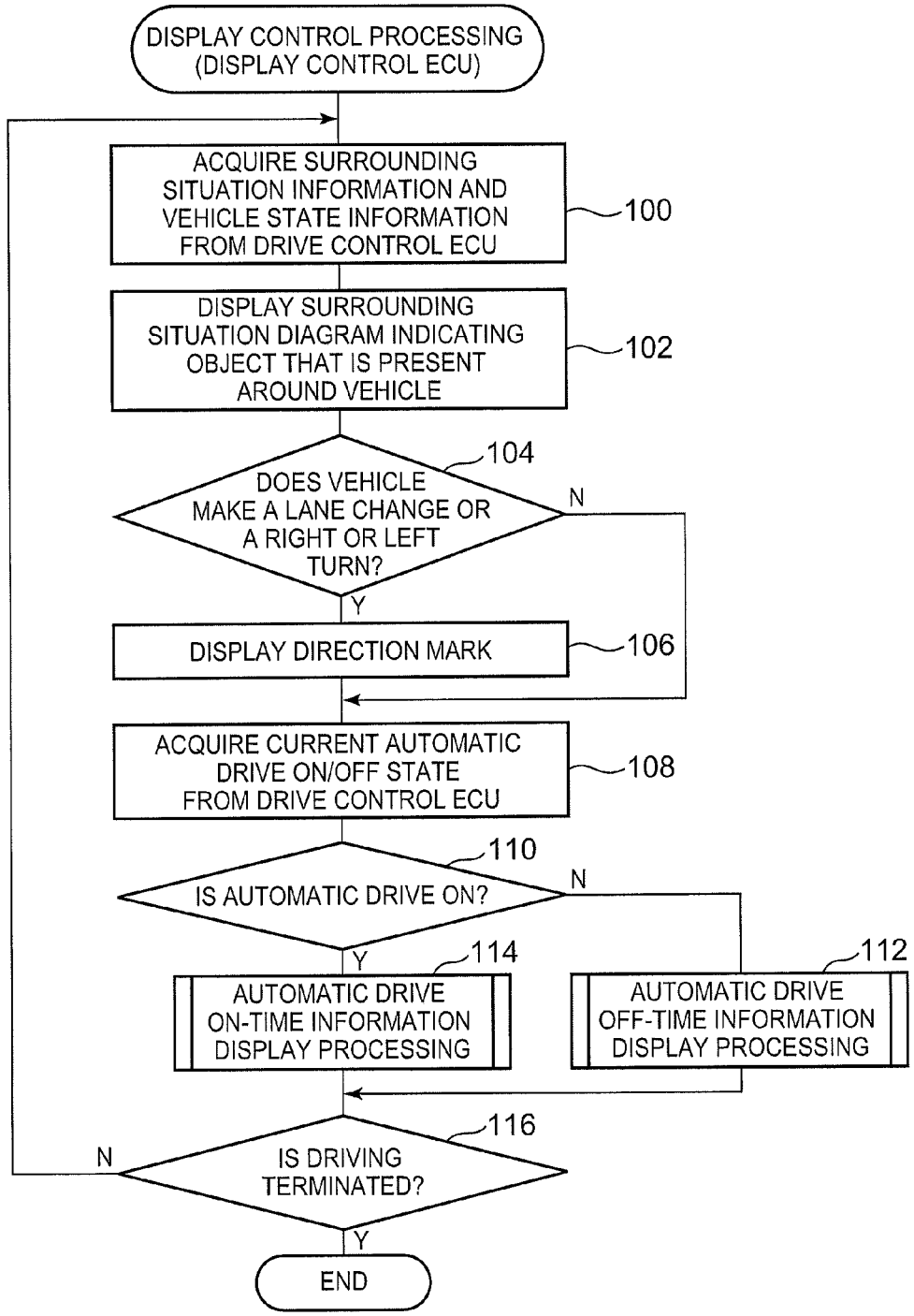
FIG. 4 is a flowchart showing the contents of the display control processing.

In step 100 of the display control processing shown in FIG. 4, the display control unit 62 acquires the surrounding situation information and the vehicle state information from the automatic drive control ECU 20. The surrounding situation information, acquired by the automatic drive control ECU 20 from the surrounding situation acquisition unit 12, indicates the surrounding environment situation of the vehicle. The vehicle state information, acquired by the automatic drive control ECU 20 from the vehicle traveling state acquisition unit 14, indicates the traveling state and the operation state of the vehicle. The surrounding situation information acquired in step 100 includes information on an object around the vehicle sensed by the surrounding situation sensor 32. In step 102 that follows, the display control unit 62 displays a surrounding situation diagram 300, which indicates an object in a range within a predetermined distance from the vehicle, on the front windshield glass 88 via the HUD 76.

FIG. 8 to FIG. 29 show examples of the surrounding situation diagram 300 that is displayed on the front windshield glass 88. The surrounding situation diagram 300 in this embodiment is elliptic in shape, where the triangle graphic in the center of the elliptic shape indicates the vehicle (host vehicle). When there is an object in a range within a predetermined distance from the vehicle, a mark 302, which indicates the presence of an object, is displayed at a position corresponding to the direction from the vehicle to the object in the elliptic shape in the surrounding situation diagram 300 (see FIG. 19 to FIG. 22, FIG. 29).

In this embodiment, the surrounding situation diagram 300 is displayed at all times on the front windshield glass 88 while the display control unit 62 performs the display control processing. The driver can visually recognize the surrounding situation diagram 300, displayed on the front windshield glass 88, to recognize the presence or absence of an object in a range within a predetermined distance from the vehicle (including a blind spot from the vehicle). At the same time, when there is an object within a predetermined distance from the vehicle, the driver can recognize the direction in which the object is present.

The surrounding situation diagram 300 is not necessarily be displayed at all times on the front windshield glass 88. For example, the surrounding situation diagram 300 may be displayed on the front windshield glass 88 only when there is an object within a predetermined distance from the vehicle.

In step 104 that follows, the display control unit 62 determines whether the vehicle will make a lane change or a right or left turn based on the vehicle state information acquired from the automatic drive control ECU 20 in step 100 described above. If the determination in step 104 is negative, the processing proceeds to step 108. If the determination in step 104 is affirmative, the processing proceeds to step 106. In step 106, the display control unit 62 displays a direction mark 304, which indicates the right-turn/left-turn direction or the lane change direction, on the front windshield glass 88 via the HUD 76.

Figure 11:
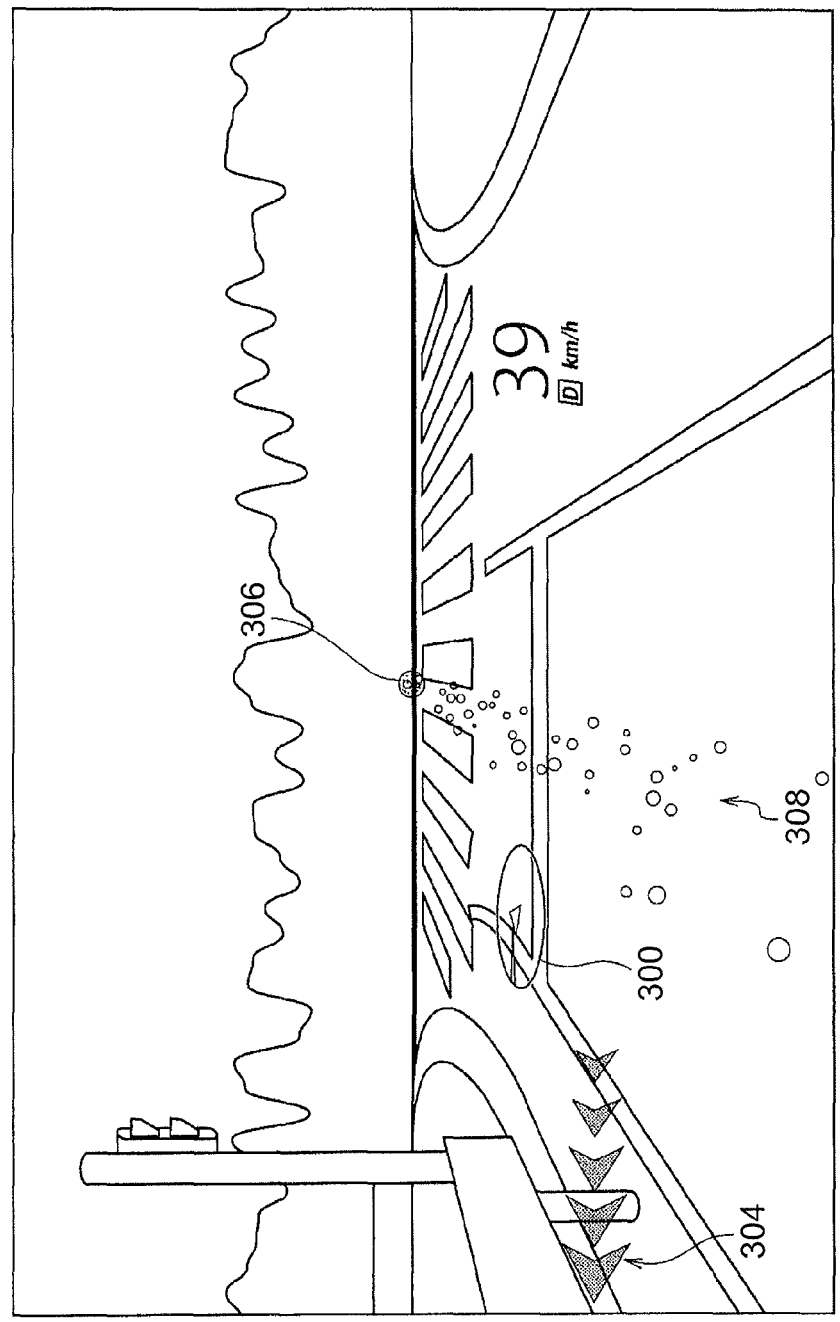
FIG. 11 is an image diagram showing an example of display on the HUD when a vehicle turns left.
Figure 12:
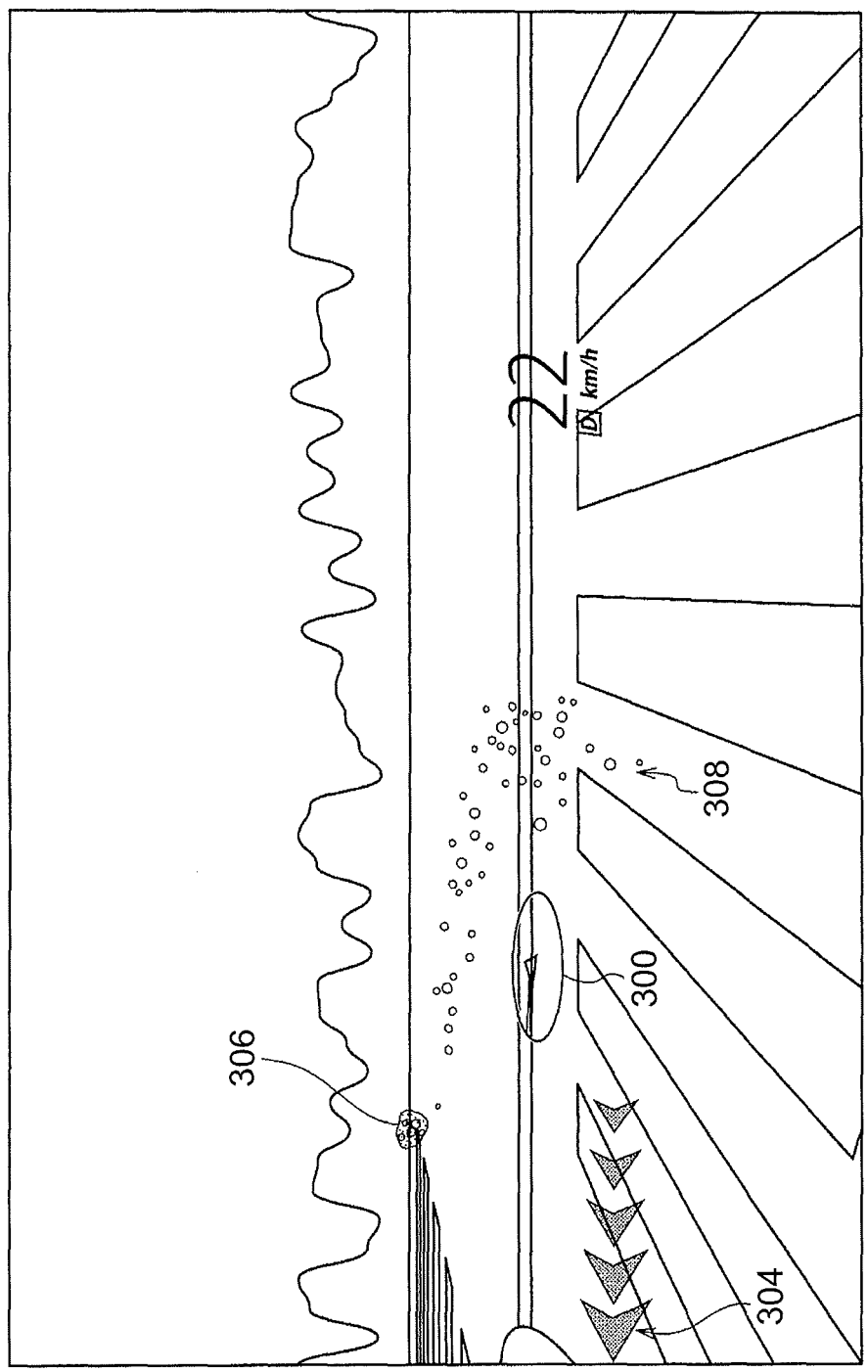
FIG. 12 is an image diagram showing an example of display on the HUD when a vehicle turns left.
Figure 13:
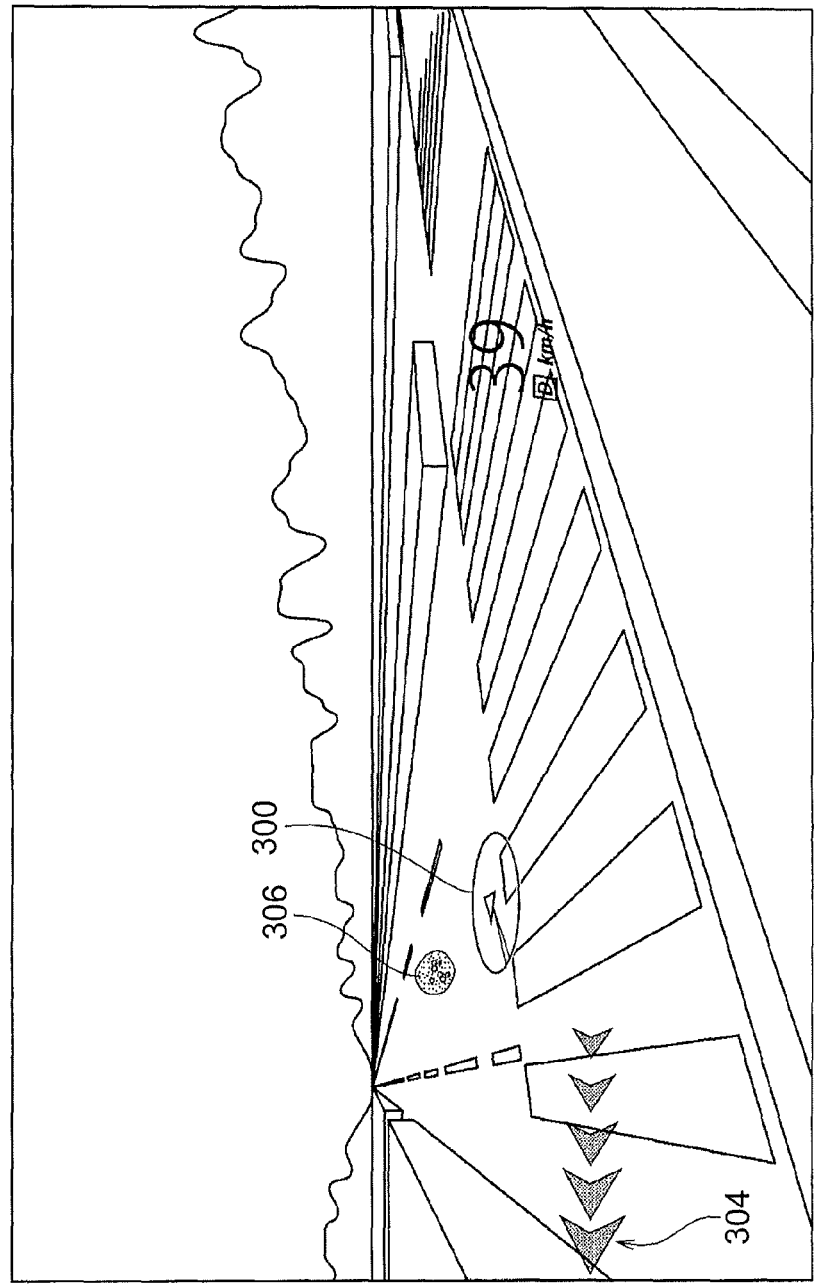
FIG. 13 is an image diagram showing an example of display on the HUD when a vehicle turns left.
Figure 14:
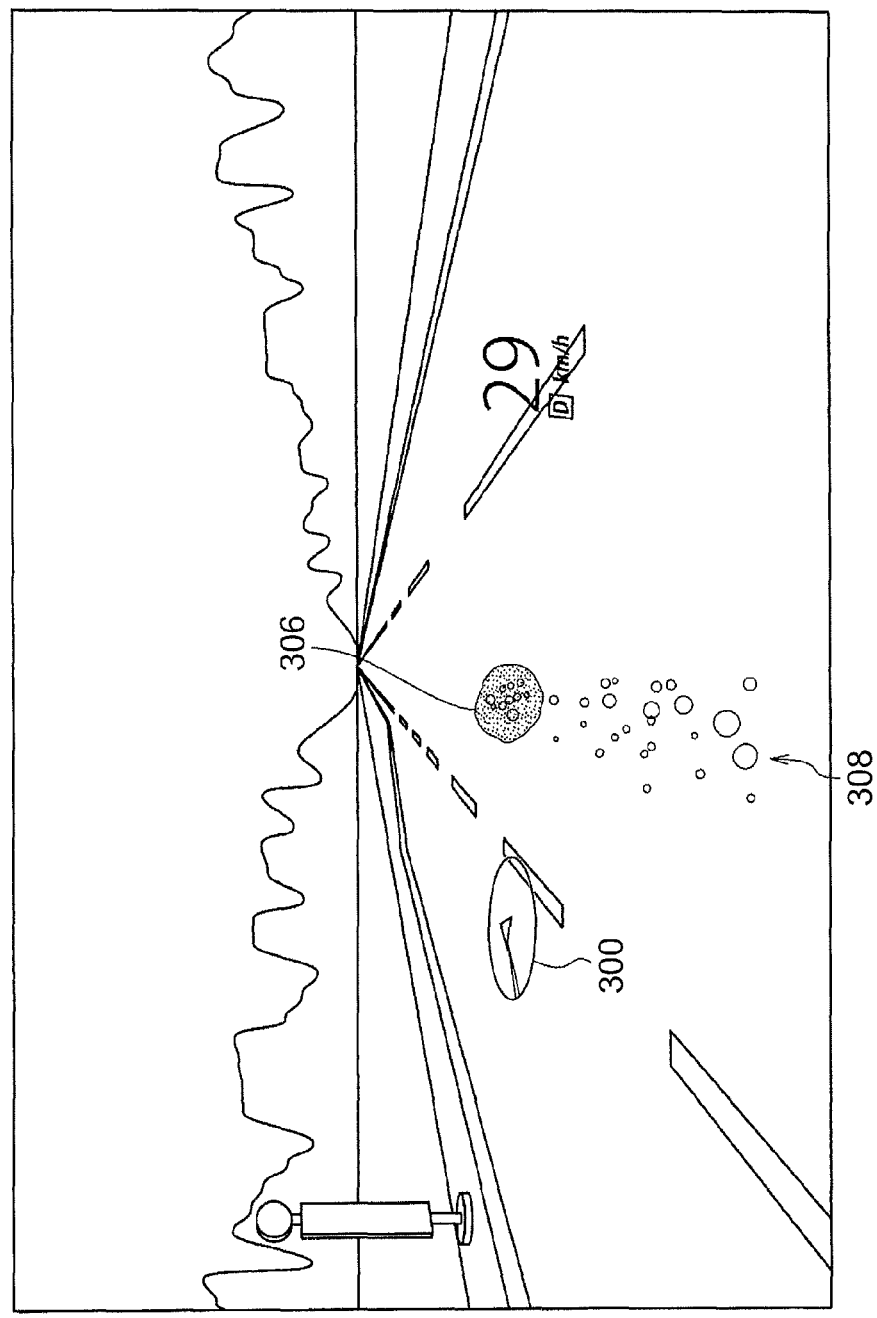
FIG. 14 is an image diagram showing an example of display on the HUD when a vehicle turns left.
Figure 15:
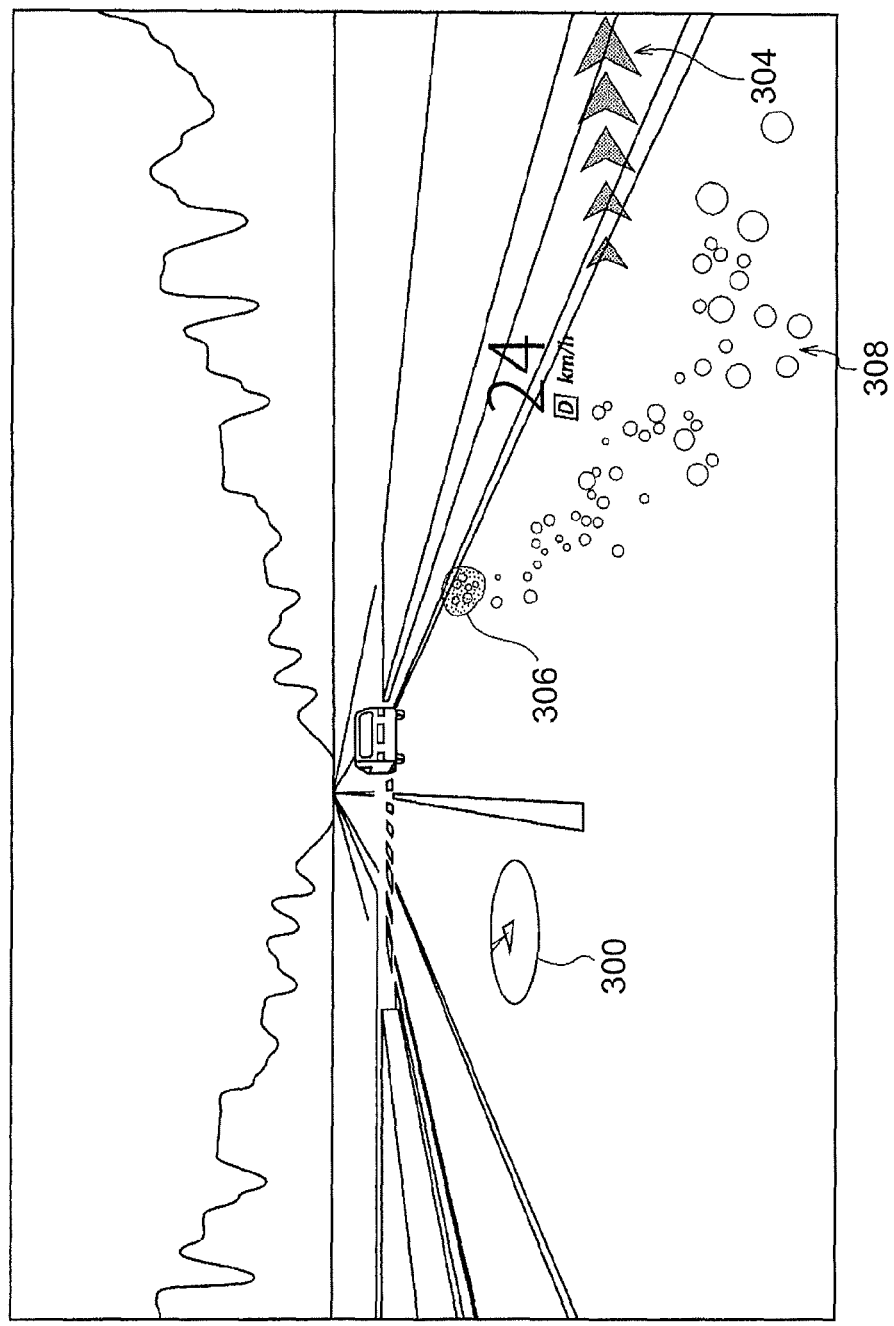
FIG. 15 is an image diagram showing an example of display on the HUD when a vehicle turns right.
Figure 16:
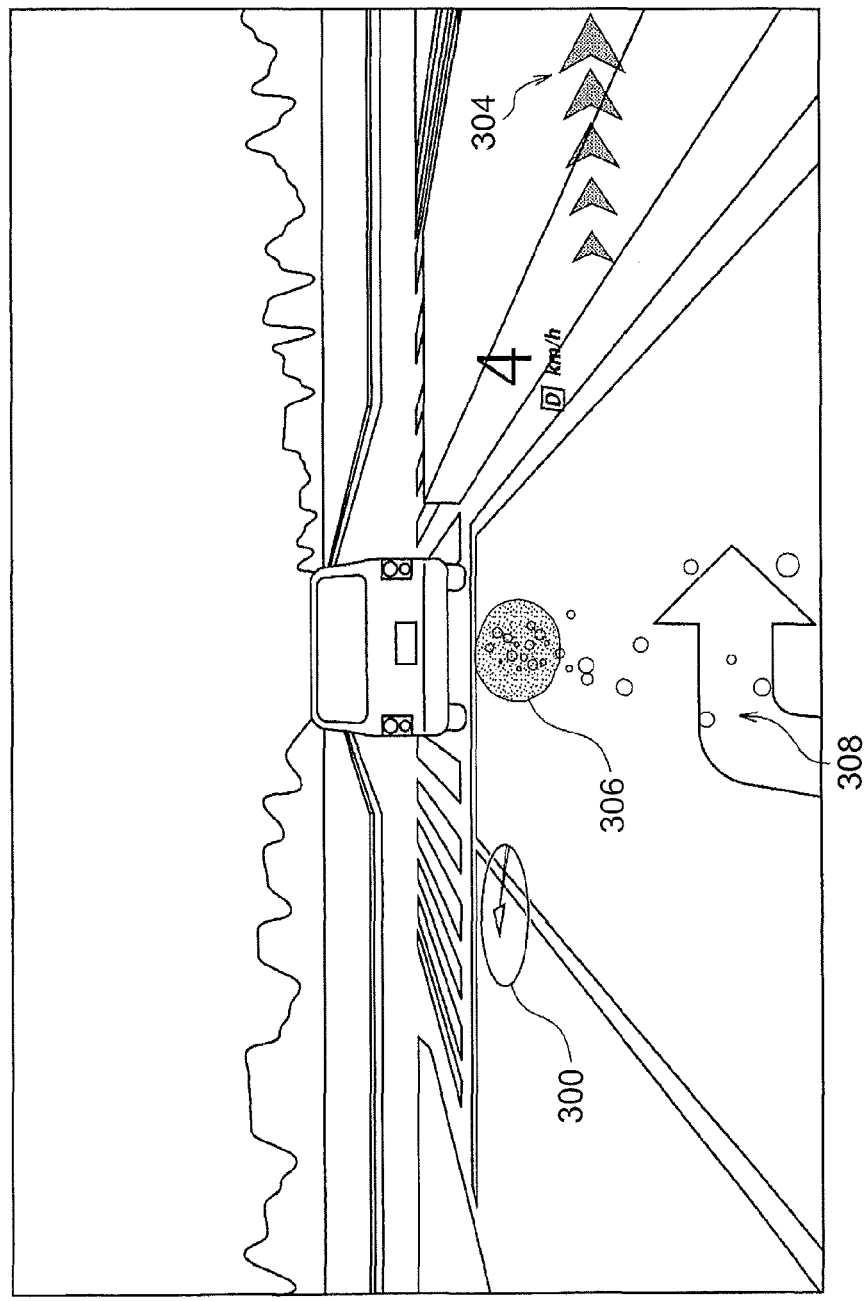
FIG. 16 is an image diagram showing an example of display on the HUD when a vehicle turns right.
Figure 17:
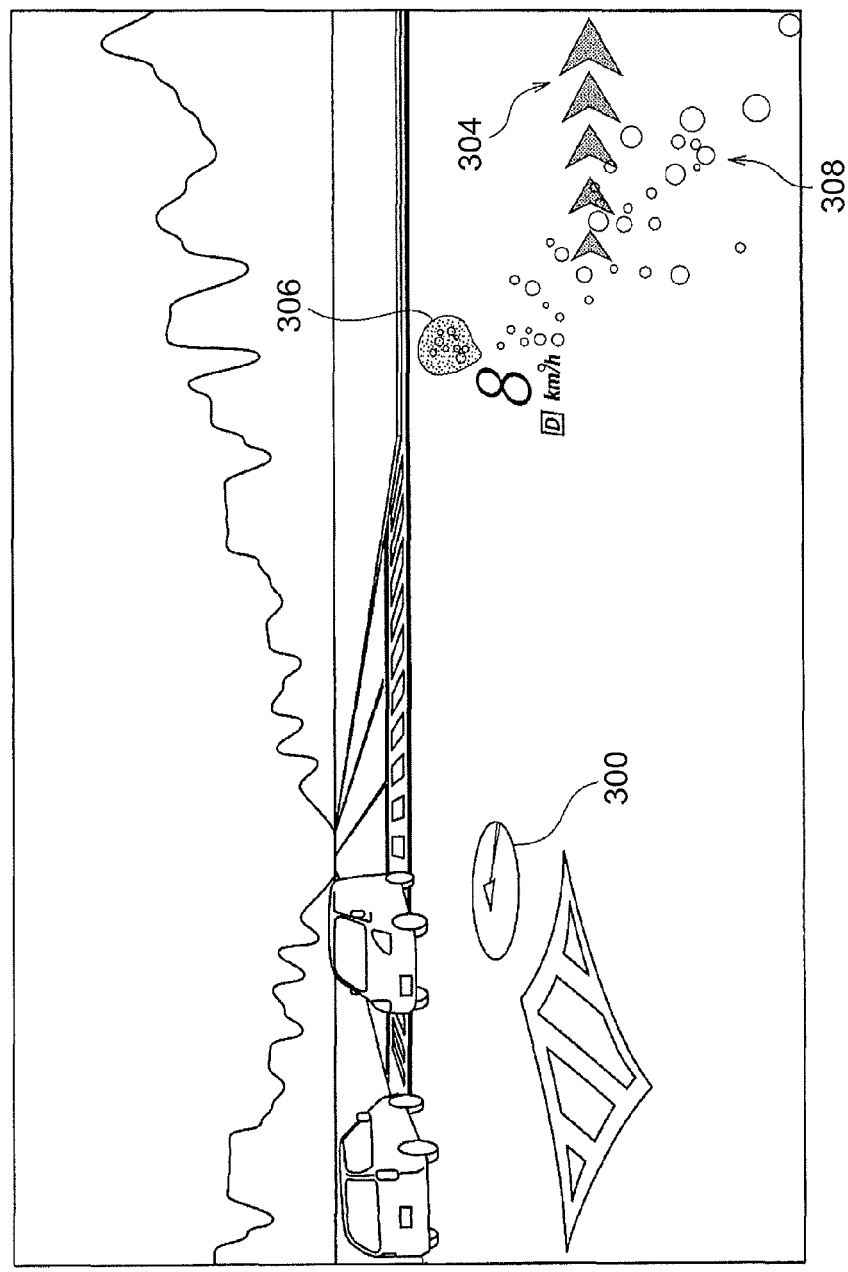
FIG. 17 is an image diagram showing an example of display on the HUD when a vehicle turns right.
Figure 18:
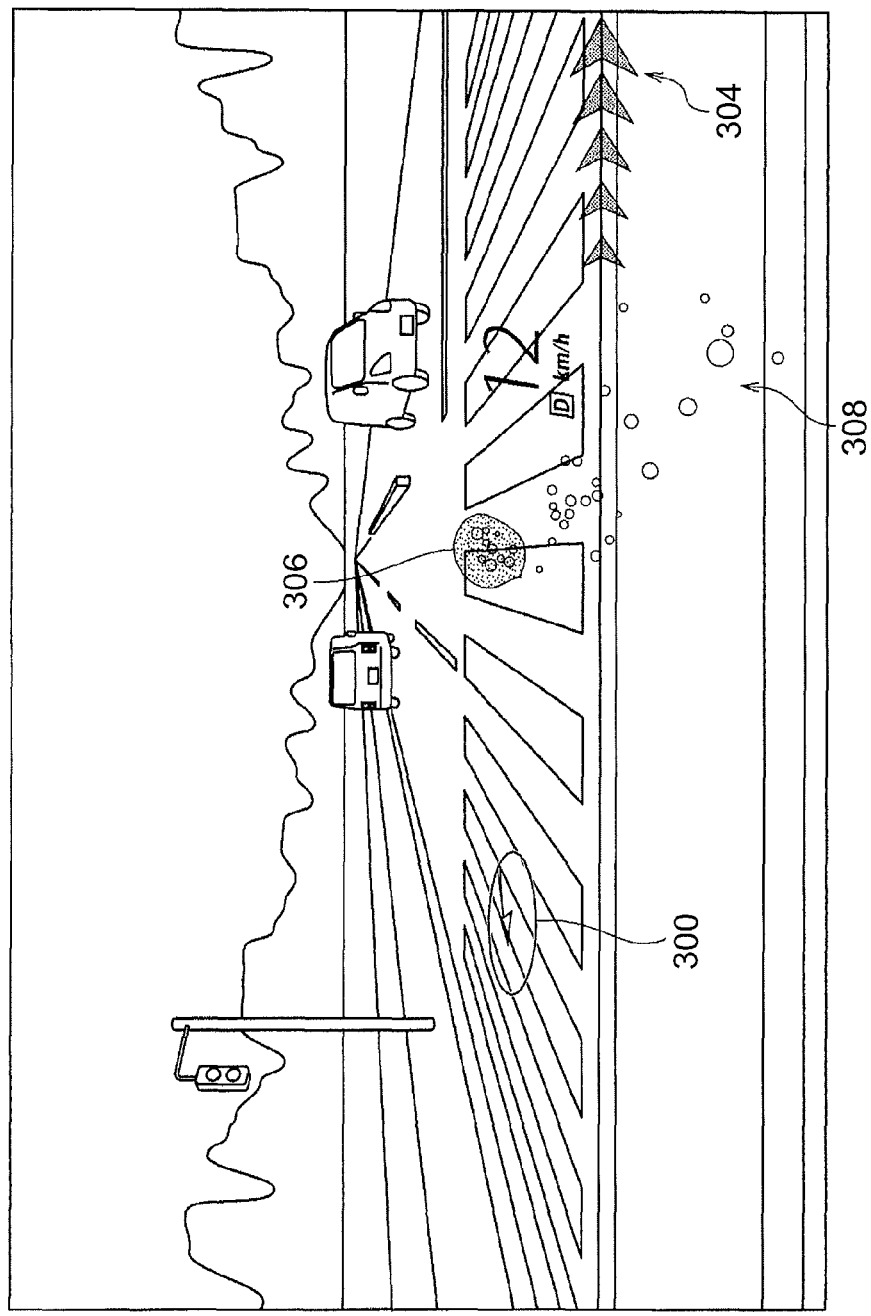
FIG. 18 is an image diagram showing an example of display on the HUD when a vehicle turns right.
Figure 27:
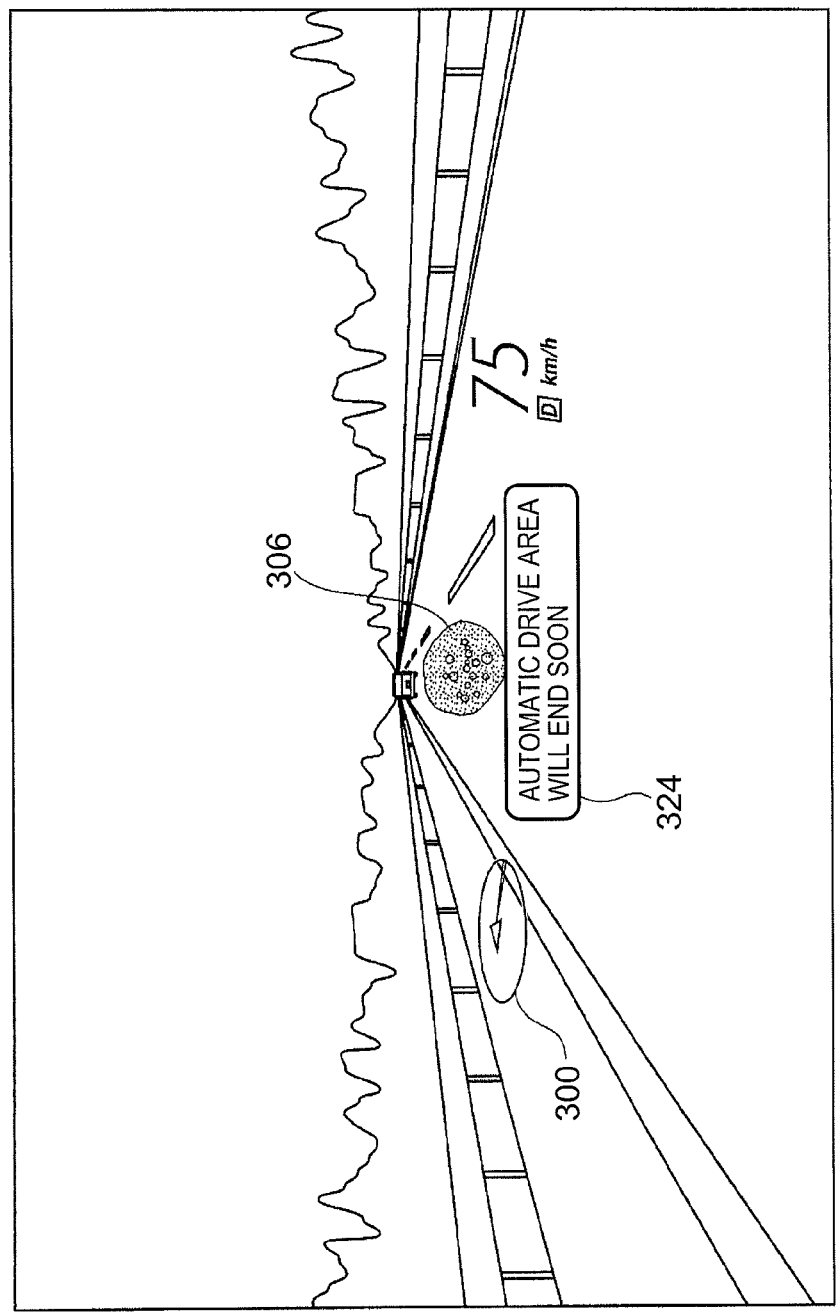
FIG. 27 is an image diagram showing an example of display on the HUD when automatic drive is terminated.

FIG. 11 to FIG. 13 show examples of the direction mark 304 that is displayed on the front windshield glass 88 when the vehicle makes a left turn at an intersection. FIG. 15 to FIG. 18 show examples of the direction mark 304 that is displayed on the front windshield glass 88 when the vehicle makes a right turn at an intersection. FIG. 27 shows an example of the direction mark 304 that is displayed on the front windshield glass 88 when the vehicle makes a lane change. The direction mark 304 in this embodiment is composed of a plurality of triangular marks. One vertex of each of the triangular marks is directed toward the direction in which the vehicle is to turn. A combination of the plurality of differently sized marks indicates the direction in which the vehicle is to turn.

In this embodiment, the display control unit 62 performs the display control processing and, when the vehicle makes a lane change or a right or left turn, the direction mark 304 is displayed on the front windshield glass 88. By visually recognizing the direction mark 304 displayed on the front windshield glass 88, the driver can recognize that the vehicle will makes a lane change or a right or left turn as well as the direction in which the vehicle will turn.

In step 108 that follows, the display control unit 62 acquires the information, which indicates whether the automatic drive control unit 46 is currently performing the automatic drive control processing (current automatic drive on/off state), from the automatic drive control ECU 20. In step 110, based on the information acquired in step 108, the display control unit 62 determines whether the current driving state is the automatic drive on state.

If the automatic drive control unit 46 is not currently performing the automatic drive control processing, the determination in step 110 is negative and the processing proceeds to step 112. In step 112, the display control unit 62 performs the automatic drive off-time information display processing. If the automatic drive control unit 46 is currently performing the automatic drive control processing, the determination in step 110 is affirmative and the processing proceeds to step 114. In step 114, the display control unit 62 performs the automatic drive on-time information display processing. The automatic drive off-time information display processing and the automatic drive on-time information display processing will be described later.

In step 116 that follows, based on whether the ignition switch of the vehicle is turned off, the display control unit 62 determines whether the driving of the vehicle is terminated. If the determination in step 116 is negative, the processing returns to step 100 and, until the determination in step 116 becomes affirmative, step 100 to step 116 are repeated. If the determination in step 116 is affirmative, the display control processing shown in FIG. 4 is terminated.

Figure 5:
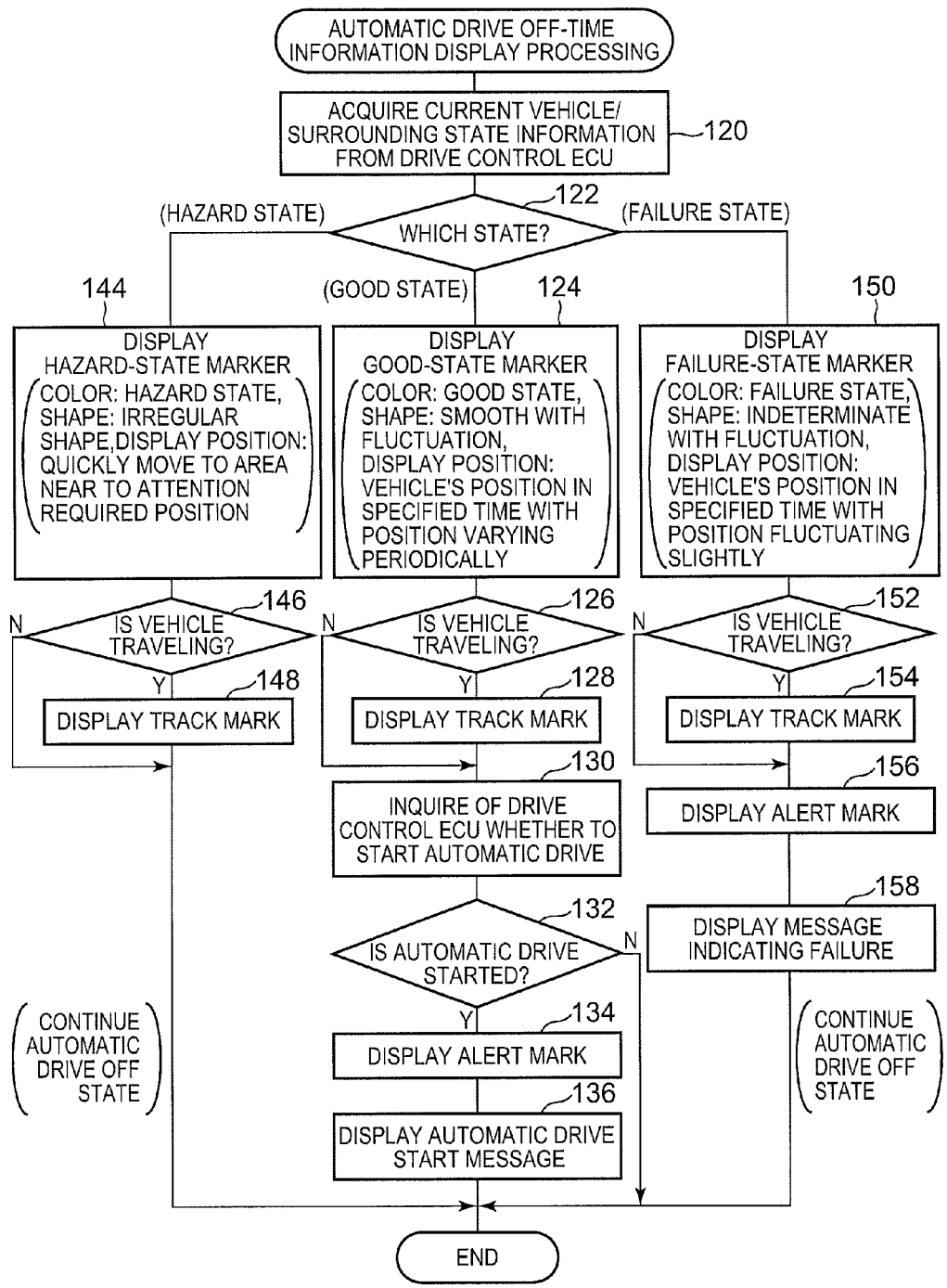
FIG. 5 is a flowchart showing the contents of the information display processing when automatic drive is off.

Next, the automatic drive off-time information display processing, which is performed by the display control unit 62 when the automatic drive control unit 46 is not performing the automatic drive control processing, is described below with reference to FIG. 5. In step 120 of the automatic drive off-time information display processing, the display control unit 62 acquires the surrounding situation information and the vehicle state information from the automatic drive control ECU 20. The information acquired by the display control unit 62 from the automatic drive control ECU 20 includes the following two types of result. One is the result produced by the automatic drive control unit 46 by determining whether the state of the vehicle and its surroundings is the "good state", "hazard state", or "failure state (a failure is occurred in the vehicle)". The other is the result produced by the automatic drive control unit 46 by estimating where the vehicle will be positioned in a predetermined time. In step 122, the display control unit 62 determines the state of the vehicle and its surroundings based on the information described above and passes control to the corresponding step based on the determination result.

If the state of the vehicle and its surroundings is determined as the "good state" in step 122, the processing proceeds from step 122 to step 124. The "good state" described above is an example of a "normal state". In step 124, the display control unit 62 controls the HUD 76 to display the image of a first marker 306, which indicates that the state of the vehicle and its surroundings is the "good state", on the front windshield glass 88. The first marker 306 is an example of a first marker displayed in the normal state.

Figure 8:
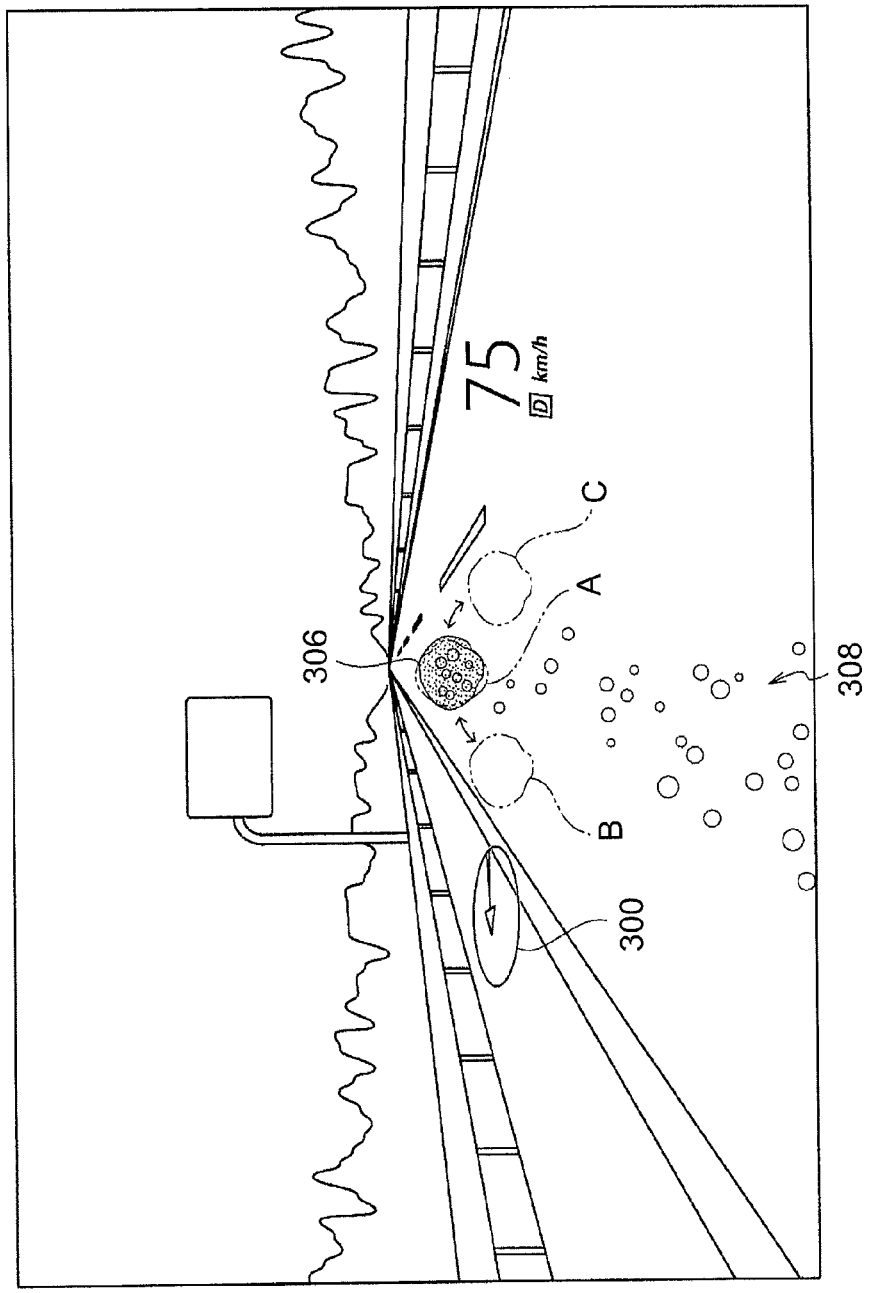
FIG. 8 is an image diagram showing an example of display on the HUD when a vehicle travels.

FIG. 8 shows an example of the first marker 306 displayed on the front windshield glass 88. The display color of the first marker 306 in this embodiment is a fresh-looking color that allows the driver to intuitively understand that the state of the vehicle and its surroundings is the "good state" (more specifically a color such as blue). The display color (first color) of the first marker 306 may be any color that gives the driver a sense of safety. For example, other colors, such as green, may also be used.

The shape of the first marker 306 is a shape (first shape) that allows the driver to intuitively understand that the state of the vehicle and its surroundings is the "good state", more specifically, a circular shape or a shape similar to a circular shape that has a smooth outline. In addition, in the image displayed on the front windshield glass 88, the shape of the first marker 306 slowly fluctuates (the shape slowly changes over time) as shown by the shape A in FIG. 8. In this case, though the shape changes over time, the fluctuation in the shape of the first marker 306 in the image is controlled in such a manner that the first marker 306 maintains a shape having a smooth outline.

The display position of the first marker 306 is around a position (vehicle-corresponding position) on the front windshield glass 88 corresponding to the position (estimated vehicle position) where the vehicle is estimated to be positioned in the real space in a predetermined time. In addition, in the image displayed on the front windshield glass 88, the display position of the first marker 306 slowly fluctuates (the display position slowly changes over time) as indicated by the positions B and C in FIG. 8. In this case, the display position of the first marker 306 in the image is controlled in such a manner that the first marker 306 slowly and periodically moves between the vehicle-corresponding position and the position in a predetermined range from the vehicle-corresponding position, which is indicated by the position B or C in FIG. 8.

In addition, the display position of the first marker 306, which corresponds to the position where the vehicle is estimated to be positioned in a predetermined time in the real space, is changed in such a manner that the first marker 306 guides the vehicle when the vehicle makes a left turn at an intersection as shown in FIG. 11 to FIG. 14 and when the vehicle makes a right turn at an intersection as shown in FIG. 14 to FIG. 18.

The first marker 306 is displayed on the front windshield glass 88 while the ignition switch of the vehicle is on and the state of the vehicle and its surroundings is the "good state". During this time, the first marker 306 shows an animated motion (behavior) as described above. Therefore, the driver can visually recognize the motion of the first marker 306 displayed on the front windshield glass 88 by the I-IUD 76. This allows the driver to easily understand that the state of the vehicle and its surroundings is normally determined by the automatic drive control unit 46 even in a period during which the automatic drive control processing is not performed by the automatic drive control unit 46. In addition, the driver, who visually recognizes the motion of the first marker 306, can understand visually and easily the direction in which the vehicle is going to travel. This gives the driver a sense of safety.

The animated motion (behavior) of the first marker 306 gives the driver a sense of reliance on, and a sense of affinity for, the first marker 306. This also reduces the possibility that the driver is distracted from the automatic drive control processing performed by the automatic drive control unit 46 in a period during which the automatic drive control processing is performed by the automatic drive control unit 46.

As the first shape of the first marker, a circular shape or a shape similar to a circular shape that has a smooth shape is used. Such a shape of the first marker intuitively gives the occupant a substantial sense of the safety.

In step 126 that follows, based on the vehicle state information acquired from the automatic drive control ECU 20 in step 120 described above, the display control unit 62 determines whether the vehicle is traveling. If the determination in step 126 is negative, the processing proceeds to step 130. If the determination in step 126 is affirmative, the processing proceeds to step 128. In step 128, the display control unit 62 displays a first-marker track mark 308, which indicates the movement track of the first marker 306 displayed on the front windshield glass 88, on the front windshield glass 88.

FIG. 8 to FIG. 12, FIG. 14 to FIG. 18, FIG. 22, and FIG. 25 show examples of the first-marker track mark 308 that is displayed on the front windshield glass 88 along with the first marker 306. In this embodiment, the first-marker track mark 308, with the same color as that of the first marker 306, is a collection of a plurality of marks arranged in such a manner that the marks is continuously flowing from the first marker 306 into an area on the front windshield glass 88 corresponding to the road surface in the real space (corresponding area on the road surface). This first-marker track mark 308 indicates the movement track of the first marker 306. Displaying the first-marker track mark 308 enables the driver, who visually recognizes the first-marker track marks 308, to recognize as if the first marker 306 was moving with the vehicle in the real space.

In step 130, the display control unit 62 inquires of the automatic drive control ECU 20 whether the automatic drive control processing is started by the automatic drive control unit 46. In step 132 that follows, based on the result of the inquiry, the display control unit 62 determines whether the automatic drive control processing is started by the automatic drive control unit 46. If the determination in step 132 is negative, the automatic drive off-time information display processing is terminated. On the other hand, if the automatic drive control processing is started by the automatic drive control unit 46, the determination in step 132 is affirmative and the processing proceeds to step 134. In step 134, the display control unit 62 displays an alert mark 310 on the front windshield glass 88 to alert the driver.

Figure 9:
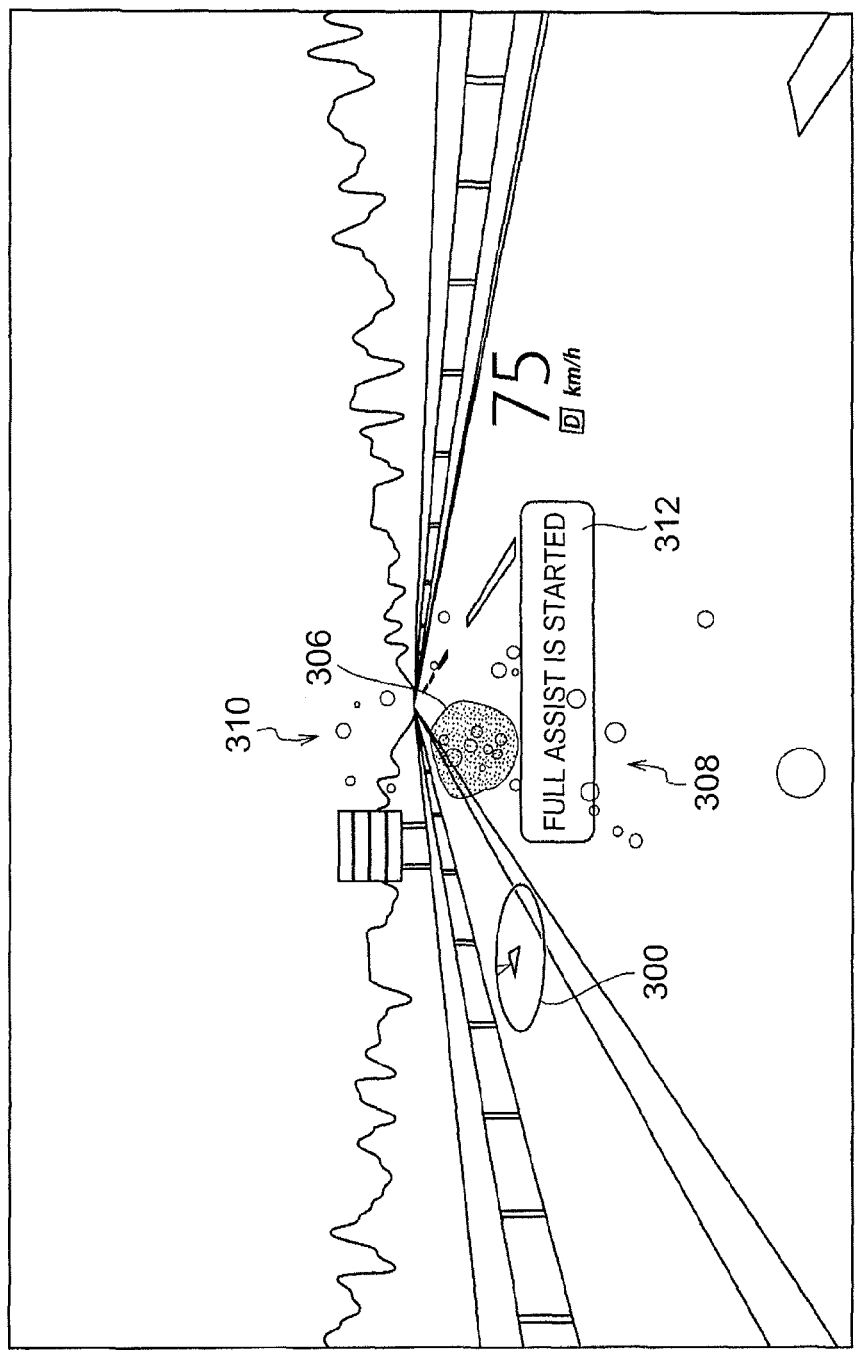
FIG. 9 is an image diagram showing an example of display on the HUD when automatic drive is started.
Figure 10:
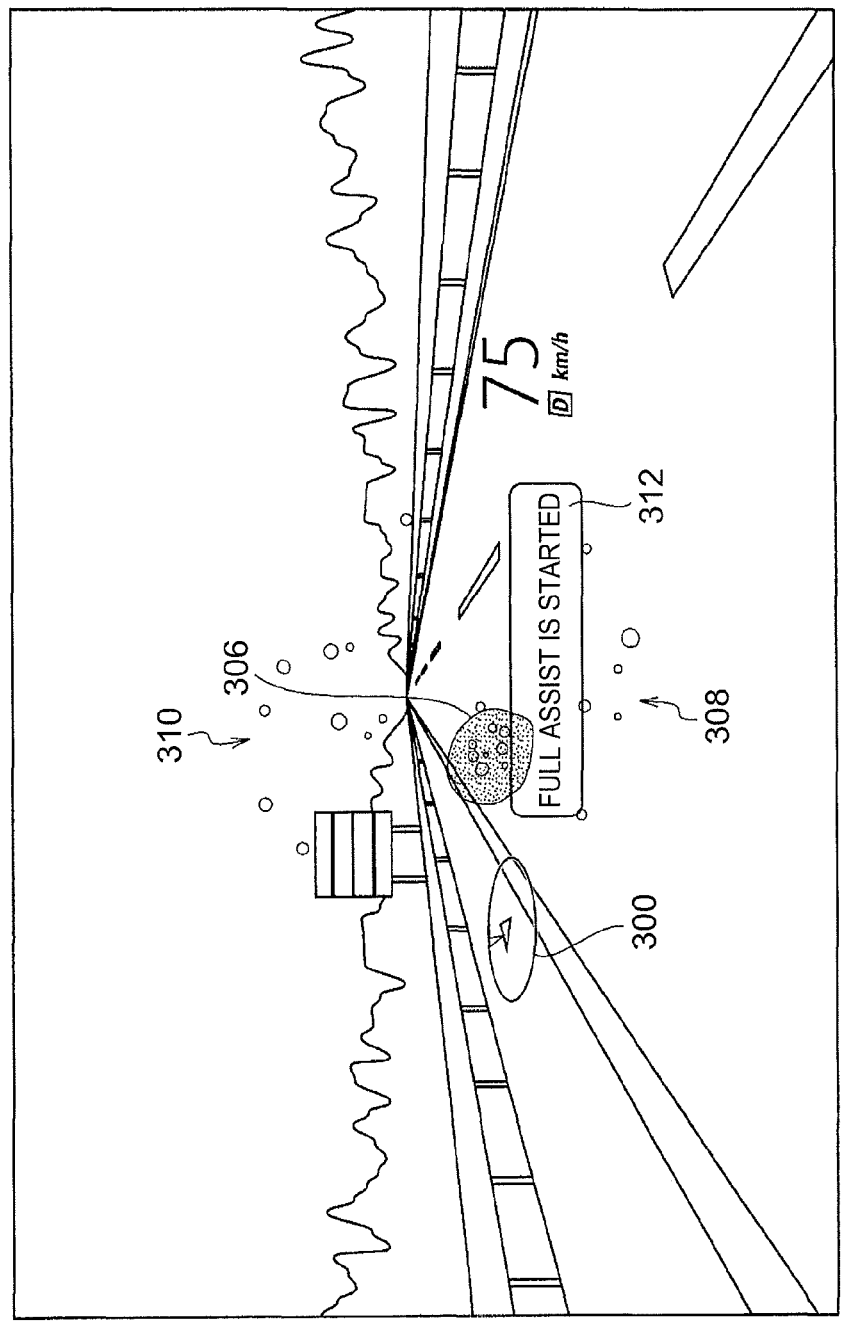
FIG. 10 is an image diagram showing an example of display on the HUD when automatic drive is started.
Figure 24:
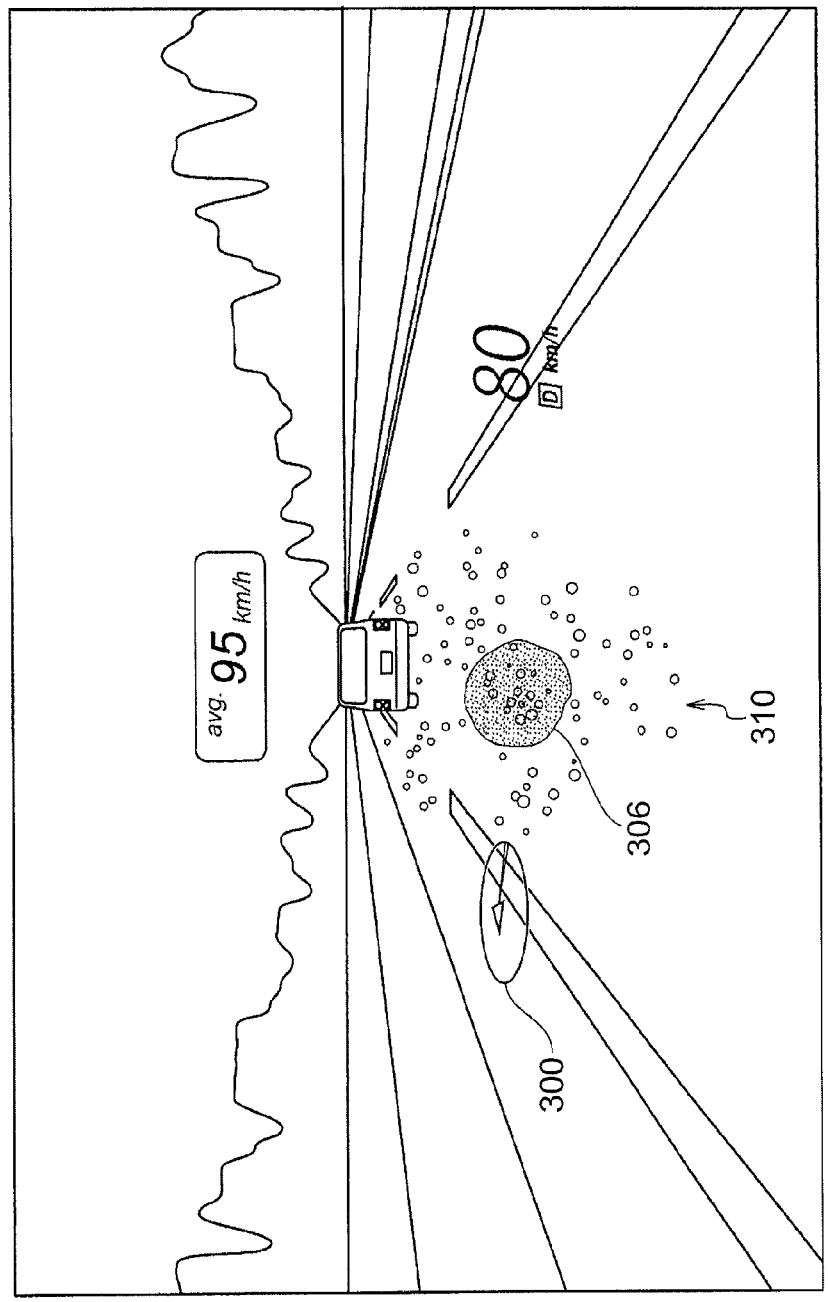
FIG. 24 is an image diagram showing an example of display on the HUD when a vehicle follows a preceding vehicle.
Figure 26:
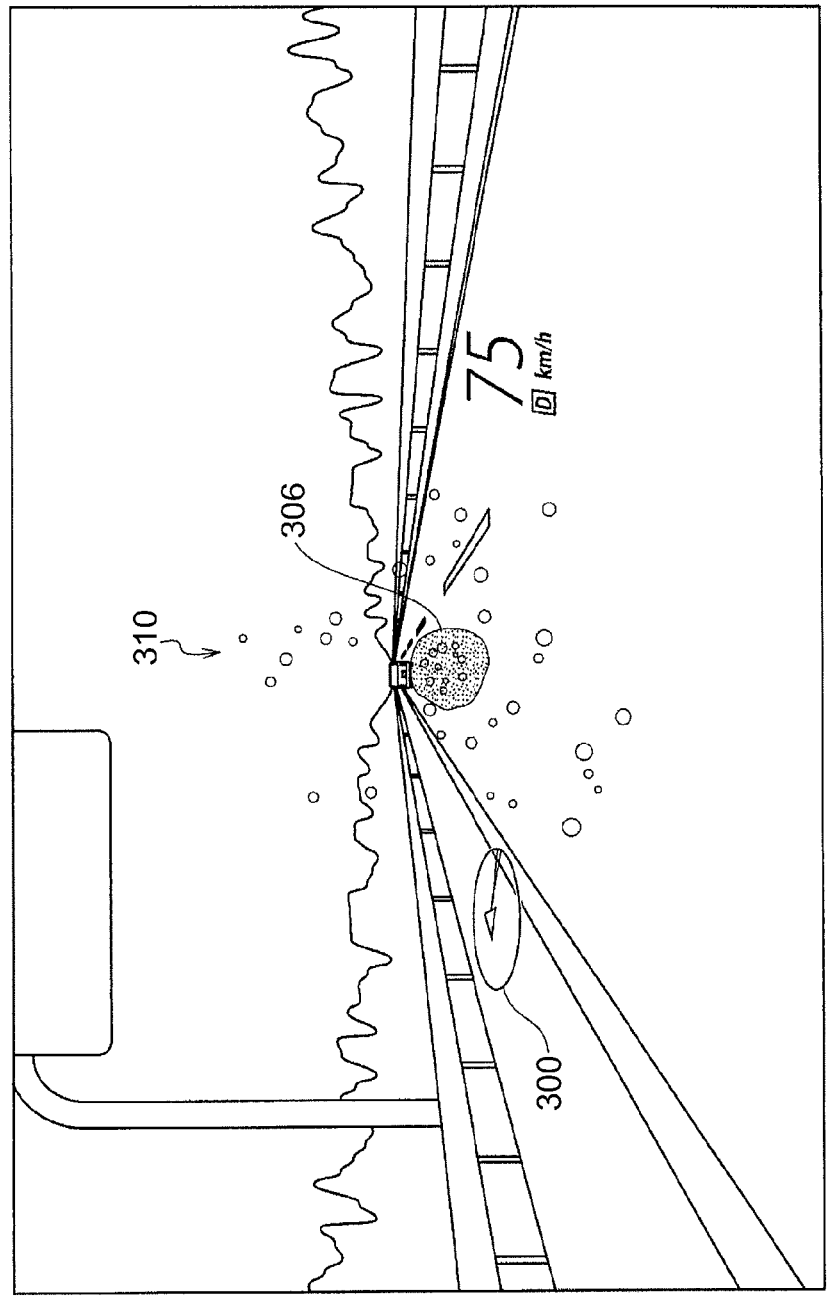
FIG. 26 is an image diagram showing an example of display on the HUD when automatic drive is terminated.
Figure 28:
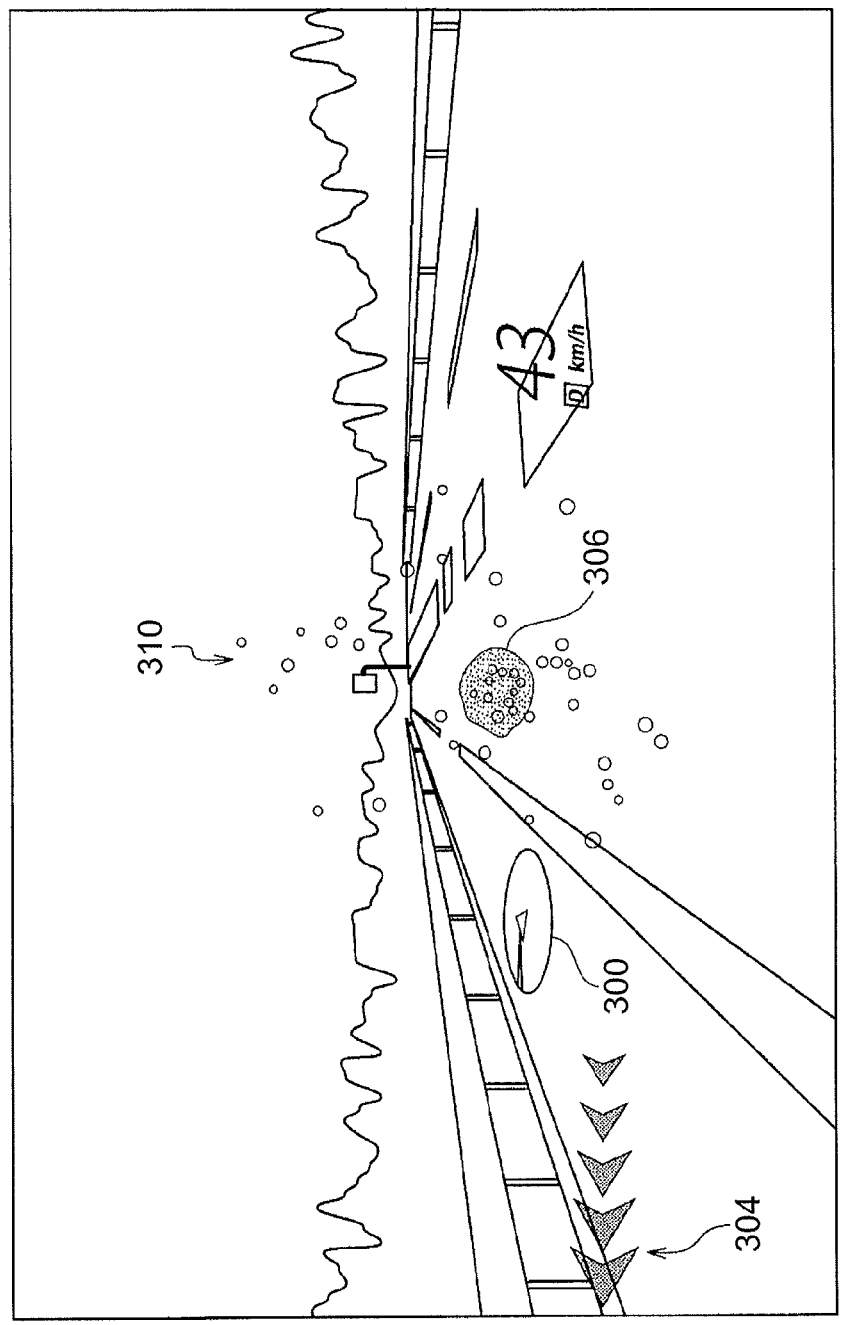
FIG. 28 is an image diagram showing an example of display on the HUD when automatic drive is terminated.

FIGS. 9 and 10 show an example of the alert mark 310 that is displayed on the front windshield glass 88 when the automatic drive control processing of the automatic drive control unit 46 is started. FIG. 24 shows an example of the alert mark 310 that is displayed on the front windshield glass 88 when following travel is started (this is an example of a "simple alert issued to the occupant"). FIGS. 26 and 28 show an example of the alert mark 310 that is displayed on the front windshield glass 88 when the automatic drive control processing of the automatic drive control unit 46 is terminated. In this embodiment, the alert mark 310 has the same color as that of the first marker 306. As is apparent from the comparison between FIG. 9 and FIG. 10, the alert mark 310 is a collection of a plurality of marks having display positions that are scattered from a predetermined position (for example, the display position of the first marker 306). Displaying the alert mark 310 allows the driver, who visually recognizes the alert mark 310, to pay attention to the predetermined position or to an area near to that position. The alert mark 310 is displayed to issue a simple alert to the occupant, for example, when the hazard level of the surrounding situation of the vehicle is slightly increased though the hazard level has not yet reached a level at which the second mark is displayed.

In step 136, the display control unit 62 displays a message 312 (an example is shown in FIGS. 9 and 10), which informs the driver that the automatic drive control processing is started by the automatic drive control unit 46, at a position on the front windshield glass 88 that is near to the display position of the first marker 306. Because the alert mark 310 is displayed as described above, the driver's attention is already directed to an area near to the display position of the first marker 306. Therefore, displaying the message 312 at a position, to which the driver's attention is directed, allows the driver to know smoothly that the automatic drive control processing is started by the automatic drive control unit 46.

If the state of the vehicle and its surroundings is determined as the "hazard state" in step 122 described above, the processing proceeds from step 122 to step 144. In step 144, the display control unit 62 controls the HUD 76 to display the image of a second marker 314, which indicates that the state of the vehicle and its surroundings is the "hazard state", on the front windshield glass 88. The second marker 314 is an example of a second marker that is displayed when there is a need to alert the occupant. It is necessary to issue an alert to the occupant, for example, when the hazard level of the surrounding situation of the vehicle is increased.

Figure 19:
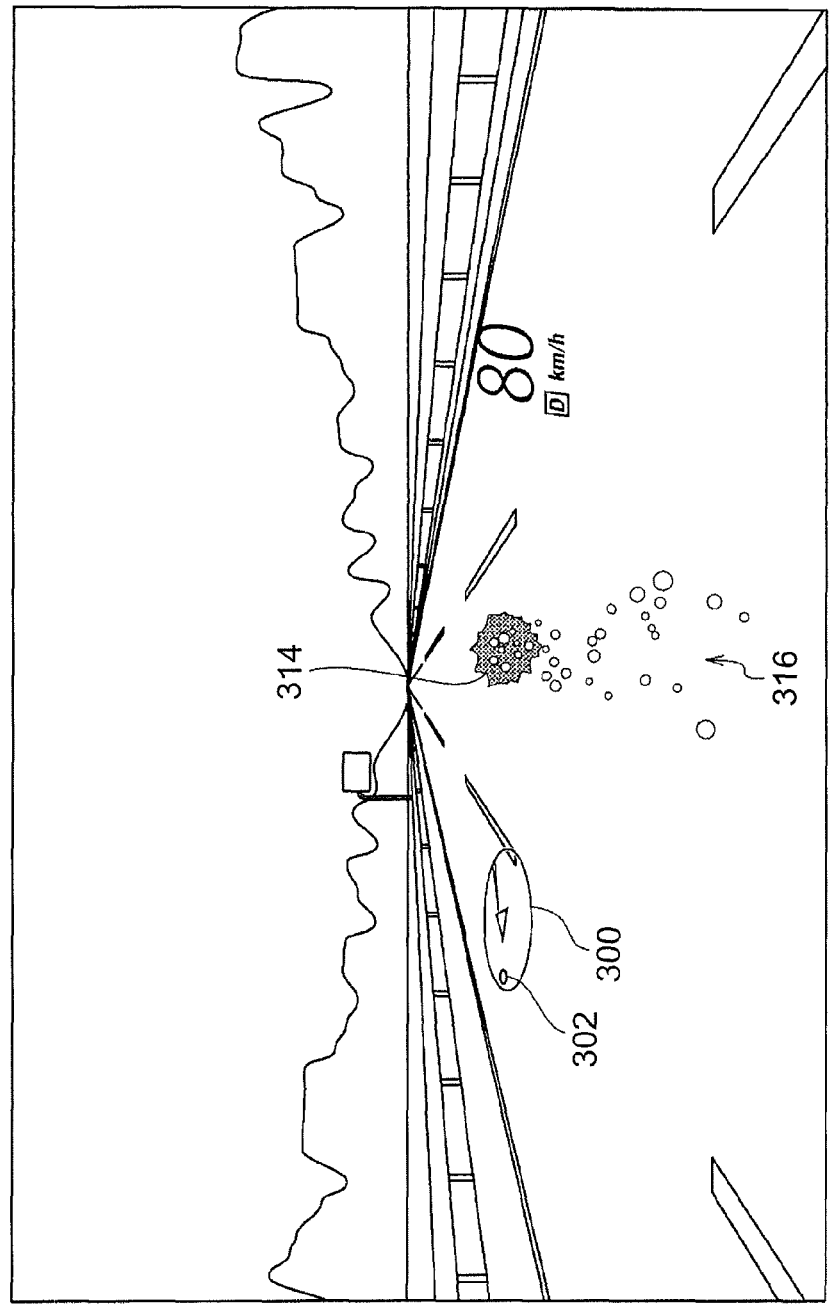
FIG. 19 is an image diagram showing an example of display on the HUD when a vehicle is passed.
Figure 20:
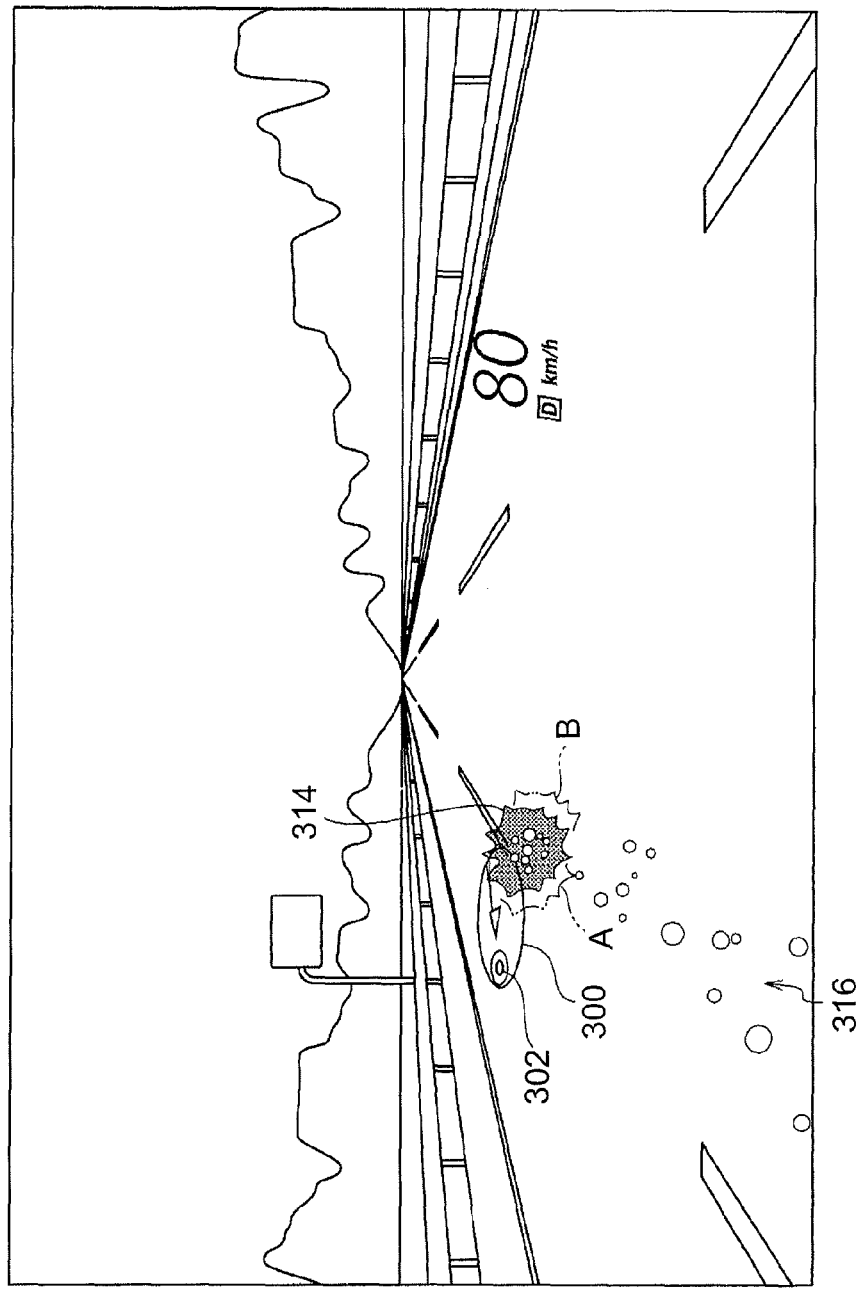
FIG. 20 is an image diagram showing an example of display on the HUD when a vehicle is passed.
Figure 21:
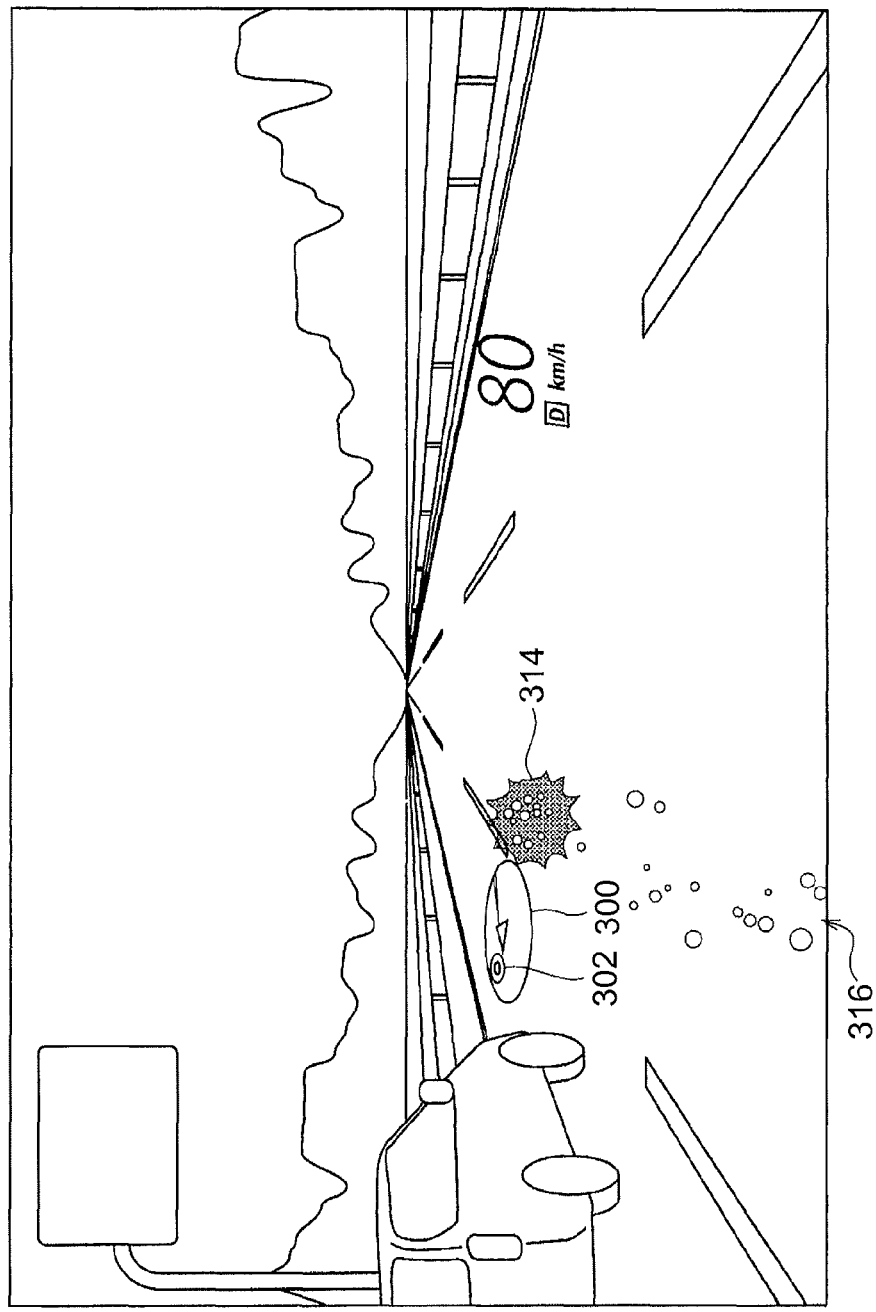
FIG. 21 is an image diagram showing an example of display on the HUD when a vehicle is passed.
Figure 22:
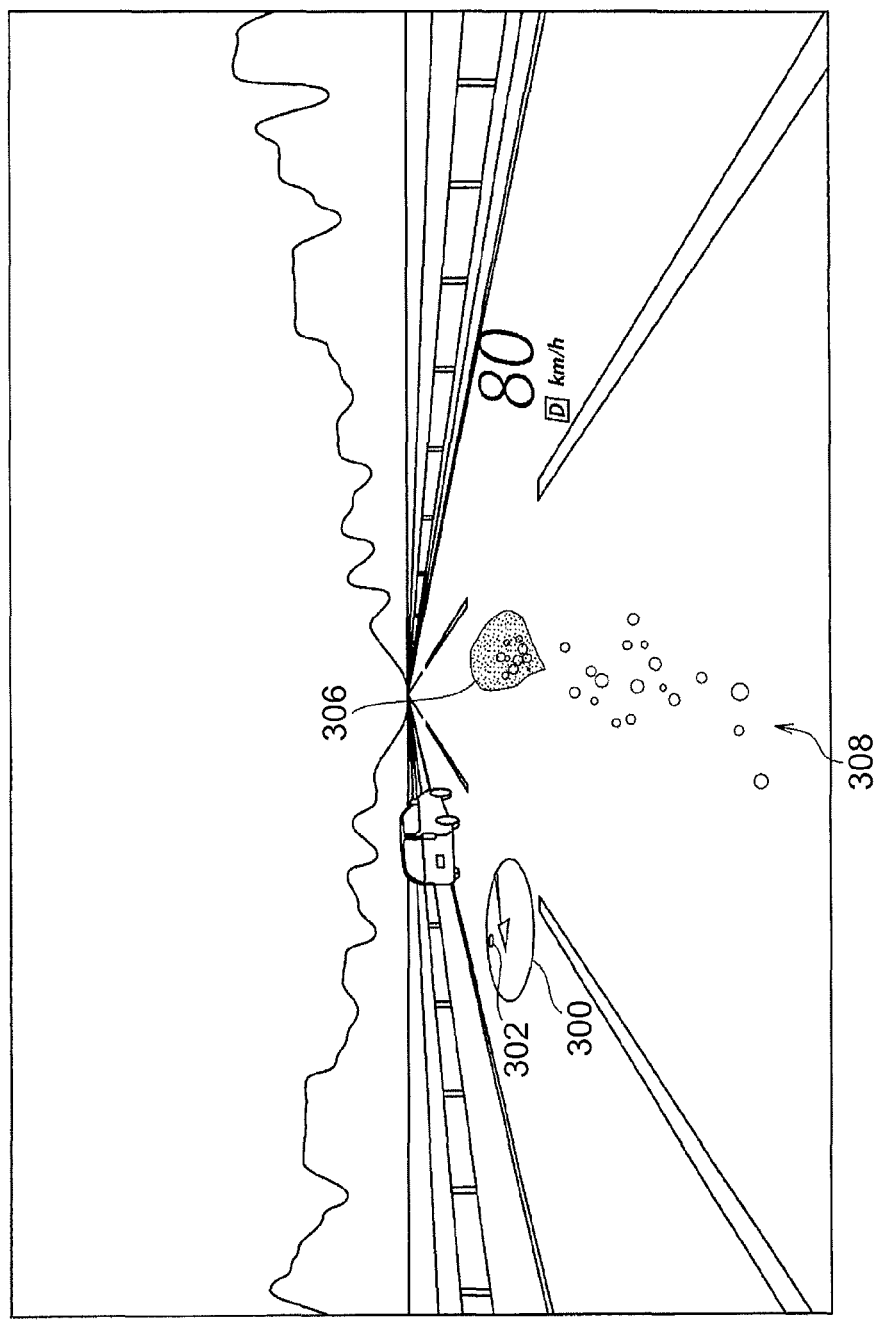
FIG. 22 is an image diagram showing an example of display on the HUD when a vehicle is passed.

FIG. 19 to FIG. 21 show an example of the second marker 314 that is displayed on the front windshield glass 88. The display color of the second marker 314 in this embodiment is a color that allows the driver to intuitively understand that the state of the vehicle and its surroundings is the "hazard state" (more specifically, a color such as yellow). The display color (second color) of the second marker 314 may be any color that informs the driver about a hazard. For example, other colors, such as red, may also be used, or the size of the second marker 314 and the brightness of the display color may be changed periodically so that the second marker 314 will appear blinking.

The shape of the second marker 314 is a shape (second shape) that allows the driver to intuitively understand that the state of the vehicle and its surroundings is the "hazard state", more specifically, a shape that has an irregular outline composed of a plurality of acute projections. In addition, in the image displayed on the front windshield glass 88, the fluctuation in the shape of the second marker 314 in the image is controlled in such a manner that, as apparent from the comparison between FIG. 19 and FIGS. 20 and 21, the whole shape of the second marker 314 slowly changes over time while maintaining its irregular shape.

The second marker 314 is first displayed at the vehicle-corresponding position as shown in FIG. 19. Then, as shown in FIGS. 20 and 21, the change in the display position of the second marker 314 in the image is controlled in such a manner that the display position moves to the position on the front windshield glass 88, which corresponds to the location in the real space where driver's attention is required (attention-required-location corresponding position), at a speed higher than the speed of the fluctuation in the display position of the first marker 306. In the examples in FIG. 19 to FIG. 20, the state of the vehicle and its surroundings is determined as the "hazard state" because there is another vehicle that is going to pass the vehicle from the left rear. Therefore, the display position of the second marker 314 is moved to a position displaced left in the vehicle's traveling lane, as the attention-required-location corresponding position.

In the image displayed on the front windshield glass 88, there is a slow fluctuation (the display position slowly changes over time) also in the display position of the second marker 314, as shown by the positions A and B in FIG. 20, after the second marker 314 has moved to the attention-required-location corresponding position. In this case, after the second marker 314 has moved in the image to the attention-required-location corresponding position, the fluctuation in the display position of the second marker 314 in the image is controlled in such a manner that the second marker 314 slowly and periodically moves between the positions A and B in FIG. 20 that are within a predetermined range from the attention-required-location corresponding position.

As described above, if the state of the vehicle and its surroundings is determined as the "hazard state" while the ignition switch of the vehicle is on, the marker displayed on the front windshield glass 88 is changed from the first marker 306 to the second marker 314. At this time, the marker's display color, shape, display position, and speed of movement to the display position are changed. This change alerts the driver so that the driver intuitively understands the situation. In addition, the change in the display color, shape, and display position of the marker displayed on the front windshield glass 88, as well as the change in the speed of the movement of the marker to the display position, alert the driver. Therefore, the alert issued in this way can lead to a reduction in an excessive load on the driver that might otherwise be generated by an excessive display change that results in annoying the driver or by an excessive display change that results in transmitting too much information to the driver.

In step 146 that follows, based on the vehicle state information acquired from the automatic drive control ECU 20 in step 120 described above, the display control unit 62 determines whether the vehicle is traveling. If the determination in step 146 is negative, the automatic drive off-time information display processing is terminated. If the determination in step 146 is affirmative, the processing proceeds to step 148. In step 148, the display control unit 62 displays a second-marker track mark 316, which indicates the movement track of the second marker 314 displayed on the front windshield glass 88, on the front windshield glass 88.

FIG. 19 to FIG. 21 show examples of the second-marker track mark 316 that is displayed on the front windshield glass 88 along with the second marker 314. In this embodiment, the second-marker track mark 316, with the same color as that of the second marker 314, is a collection of a plurality of marks arranged in such a manner that the marks are continuously flowing from the second marker 314 into the area corresponding to the road surface. This second-marker track mark 316 indicates the movement track of the second marker 314. Displaying the second-marker track mark 316 enables the driver, who visually recognizes the second-marker track mark 316, to recognize as if the second marker 314 was moving with the vehicle in the real space.

If the state of the vehicle and its surroundings is determined as the "failure state (a failure is occurred in the vehicle)" in step 122 described above, the processing proceeds from step 122 to step 150. The failure in the vehicle includes the occurrence of a failure in one of the sensors (for example, the information output from a sensor is abnormal) and the occurrence of an abnormality during the automatic drive control processing of the automatic drive control unit 46 (for example, there is a logical conflict). In step 150, the display control unit 62 controls the HUD 76 to display the image of a third marker 318, which indicates that the state of the vehicle and its surroundings is the "failure state", on the front windshield glass 88. The third marker 318 is an example of a third marker that is displayed when a failure is occurred in the drive assist unit or in the drive assist processing performed by the drive assist unit.

Figure 23:
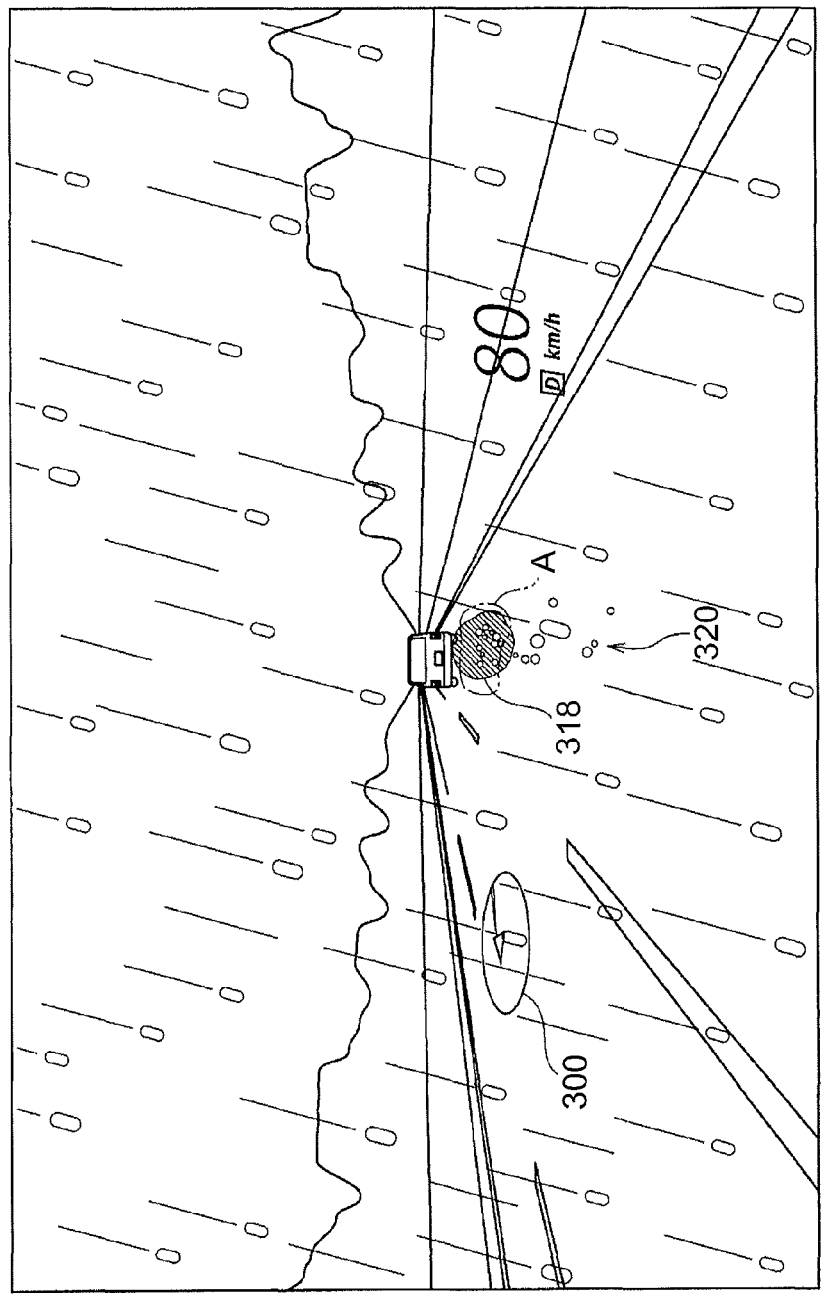
FIG. 23 is an image diagram showing an example of display on the HUD when a failure is generated.

FIG. 23 shows an example of the third marker 318 displayed on the front windshield glass 88. The display color of the third marker 318 in this embodiment is a color that allows the driver to intuitively understand that the state of the vehicle and its surroundings is the "failure state", more specifically, purple that implies a pale complexion. The display color (third color) of the third marker 318 may be any color that informs the driver that the vehicle is in the "failure state". For example, other colors, such as brown, may also be used, or the display color of the third marker 318 may be changed periodically.

Unlike the first marker 306 and the second marker 314, the third marker 318 has an indeterminate shape. In the image displayed on the front windshield glass 88, the fluctuation in the shape of the third marker 318 in the image is controlled in such a manner that, as shown as the shape A in FIG. 23, the amount of change in the shape becomes larger than the amount of change in the shape of the first marker 306 and the second marker 314. In addition, the third marker 318 is displayed near the vehicle-corresponding position as shown in FIG. 23.

As described above, if the state of the vehicle and its surroundings is determined as the "failure state" while the ignition switch of the vehicle is on, the marker displayed on the front windshield glass 88 is changed from the first marker 306 to the third marker 318. At this time, the marker's display color, shape, and amount of change in the shape are changed. This change gives the driver an impression that the state of the vehicle and its surroundings is the "failure state". In addition, the change in the display color and shape of the marker, as well as the amount of change in the shape, alert the driver. Therefore, the alert issued in this way can lead to a reduction in an excessive load on the driver that might otherwise be generated by an excessive display change that results in annoying the driver or by an excessive display change that results in transmitting too much information to the driver.

In step 152 that follows, based on the vehicle state information acquired from the automatic drive control ECU 20 in step 120 described above, the display control unit 62 determines whether the vehicle is traveling. If the determination in step 152 is negative, the processing proceeds to step 156. If the determination in step 152 is affirmative, the processing proceeds to step 154. In step 154, the display control unit 62 displays a third-marker track mark 320, which indicates the movement track of the third marker 318 displayed on the front windshield glass 88, on the front windshield glass 88.

FIG. 23 shows an example of the third-marker track mark 320 that is displayed on the front windshield glass 88 along with the third marker 318. In this embodiment, the third-marker track mark 320, with the same color as that of the third marker 318, is a collection of a plurality of marks arranged in such a manner that the marks are continuously flowing from the third marker 318 into the area corresponding to the road surface. This third-marker track mark 320 indicates the movement track of the third marker 318.

In this embodiment, the number of marks of the third-marker track mark 320 is smaller than the number of marks of the first-marker track mark 308 and the second-marker track mark 316. In addition, the end position of the marks of the third-marker track mark 320 is set nearer to the third marker 318 than the end position of the marks of the first-marker track mark 308 and the second-marker track mark 316. This display method gives the driver, who visually recognizes the third-marker track mark 320, a strong impression that the state of the vehicle and its surroundings is the "failure state".

In step 156 that follows, the display control unit 62 displays the alert mark 310, which alerts the driver, on the front windshield glass 88 in the same manner as in step 134 described above (see also FIGS. 9, 10, 24, 26, and 28). As described above, the alert mark 310 is a collection of a plurality of marks arranged in such a manner that the marks are scattered from a predetermined position (for example, the display position of the third marker 318) into the surrounding area. Displaying the alert mark 310 allows the driver, who visually recognizes the alert mark 310, to pay attention to the predetermined position or to an area near to that position.

In step 158, the display control unit 62 displays a message (not shown), which informs the driver about the occurrence of a failure, at a position on the front windshield glass 88 that is near to the display position of the third marker 318. Because the alert mark 310 is displayed as described above, the driver's attention is already directed to an area near to the display position of the third marker 318. Therefore, displaying the message at a position, to which the driver's attention is directed, allows the driver to know smoothly that a failure is occurred in the vehicle.

Figure 6:
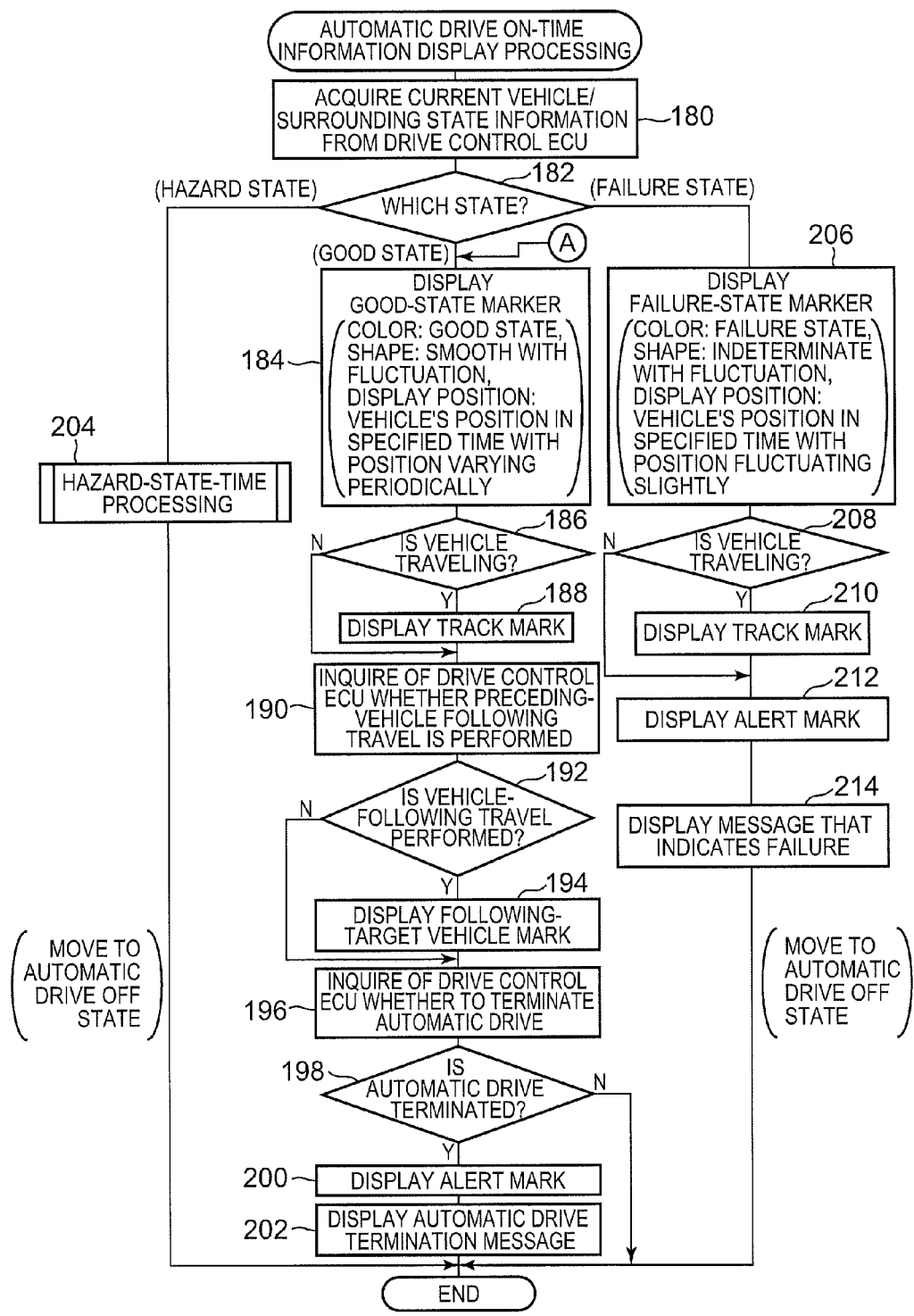
Figure 7:
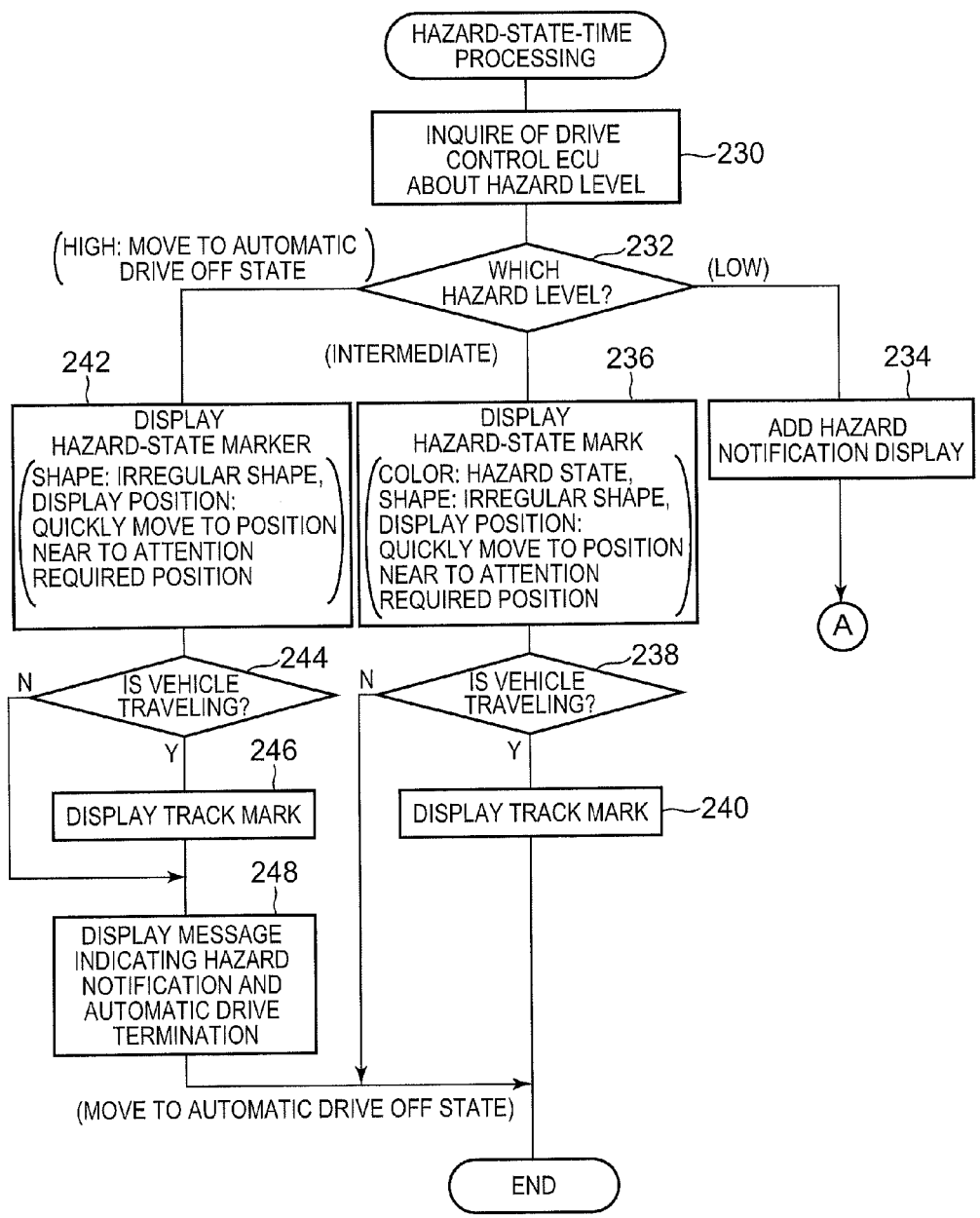
FIG. 7 is a flowchart showing the contents of the processing that is performed when a vehicle is in the hazard state.

Next, the automatic drive on-time information display processing, which is performed by the display control unit 62 when the automatic drive control unit 46 is performing the automatic drive control processing, is described below with reference to FIG. 6. In step 180 of the automatic drive on-time information display processing, the display control unit 62 acquires the surrounding situation information and the vehicle state information from the automatic drive control ECU 20. In step 182 that follows, the display control unit 62 determines the state of the vehicle and its surroundings based on the information acquired in step 180, and passes control to the corresponding step based on the determination result.

If the state of the vehicle and its surroundings is determined as the "good state" in step 182, the processing proceeds from step 182 to step 184. In step 184, the display control unit 62 controls the head-up display 76 to display the image of the first marker 306, which indicates that the state of the vehicle and its surroundings is the "good state", on the front windshield glass 88 in the same manner as described in step 124.

As described above, the display color of the first marker 306 in this embodiment is a fresh-looking color (more specifically a color such as blue) that allows the driver to intuitively understand that the state of the vehicle and its surroundings is the "good state". The shape of the first marker 306 is a shape that allows the driver to intuitively understand that the state of the vehicle and its surroundings is the "good state", more specifically, a circular shape or a shape similar to a circular shape that has a smooth outline. In addition, the shape of the first marker 306 slowly changes over time. In this case, though the shape changes over time, the fluctuation in the shape of the first marker 306 in the image is controlled in such a manner that the first marker 306 maintains a shape having a smooth outline. In addition, the display position of the first marker 306 is around the vehicle-corresponding position, and the change in the display position of the first marker 306 is controlled so that the display position will also fluctuate slowly.

Therefore, the driver can visually recognize the first marker 306 displayed on the front windshield glass 88 by the HUD 76. This allows the driver to easily understand that, while the automatic drive control processing is performed by the automatic drive control unit 46 (while the driver leaves much of the driving to the vehicle (automatic drive control unit 46)), the automatic drive control processing is normally performed by the automatic drive control unit 46, giving the driver a sense of safety. In addition, this allows the driver, who visually recognizes the motion of the first marker 306, to understand visually and easily the direction to which the vehicle is going to travel, giving the driver a sense of safety. Moreover, the animated motion (behavior) of the first marker 306 gives the driver a sense of reliance on, and a sense of affinity to, the first marker 306. This also reduces the possibility that the driver is distracted from the automatic drive control processing performed by the automatic drive control unit 46 in a period during which the automatic drive control processing is performed by the automatic drive control unit 46.

In step 186 that follows, based on the vehicle state information acquired from the automatic drive control ECU 20 in step 180 described above, the display control unit 62 determines whether the vehicle is traveling. If the determination in step 186 is negative, the processing proceeds to step 190. If the determination in step 186 is affirmative, the processing proceeds to step 188. In step 188, the display control unit 62 displays the first-marker track mark 308 on the front windshield glass 88 in the same manner as in step 128 described above. Displaying the first-marker track mark 308 enables the driver, who visually recognizes the first-marker track marks 308, to recognize as if the first marker 306 was moving with the vehicle in the real space.

In step 190 that follows, the display control unit 62 inquires of the automatic drive control ECU 20 whether the vehicle-following travel processing is performed during the current automatic drive control processing by the automatic drive control unit 46. In the vehicle-following travel processing, the vehicle is controlled to follow a specific vehicle (preceding vehicle) that is traveling ahead of the vehicle in the same direction. After that, in step 192, the display control unit 62 determines whether the vehicle is following the preceding vehicle based on the inquiry result in step 190. If the determination in step 192 is negative, the processing proceeds to step 196. If the determination in step 192 is affirmative, the processing proceeds to step 194. In step 194, the display control unit 62 causes the HUD 76 to display a following-target vehicle mark 322, which indicates that the preceding vehicle is the following target vehicle, at the position on the front windshield glass 88 corresponding to the real-space position of the preceding vehicle that the vehicle is following during the vehicle-following travel processing described above.

Figure 25:
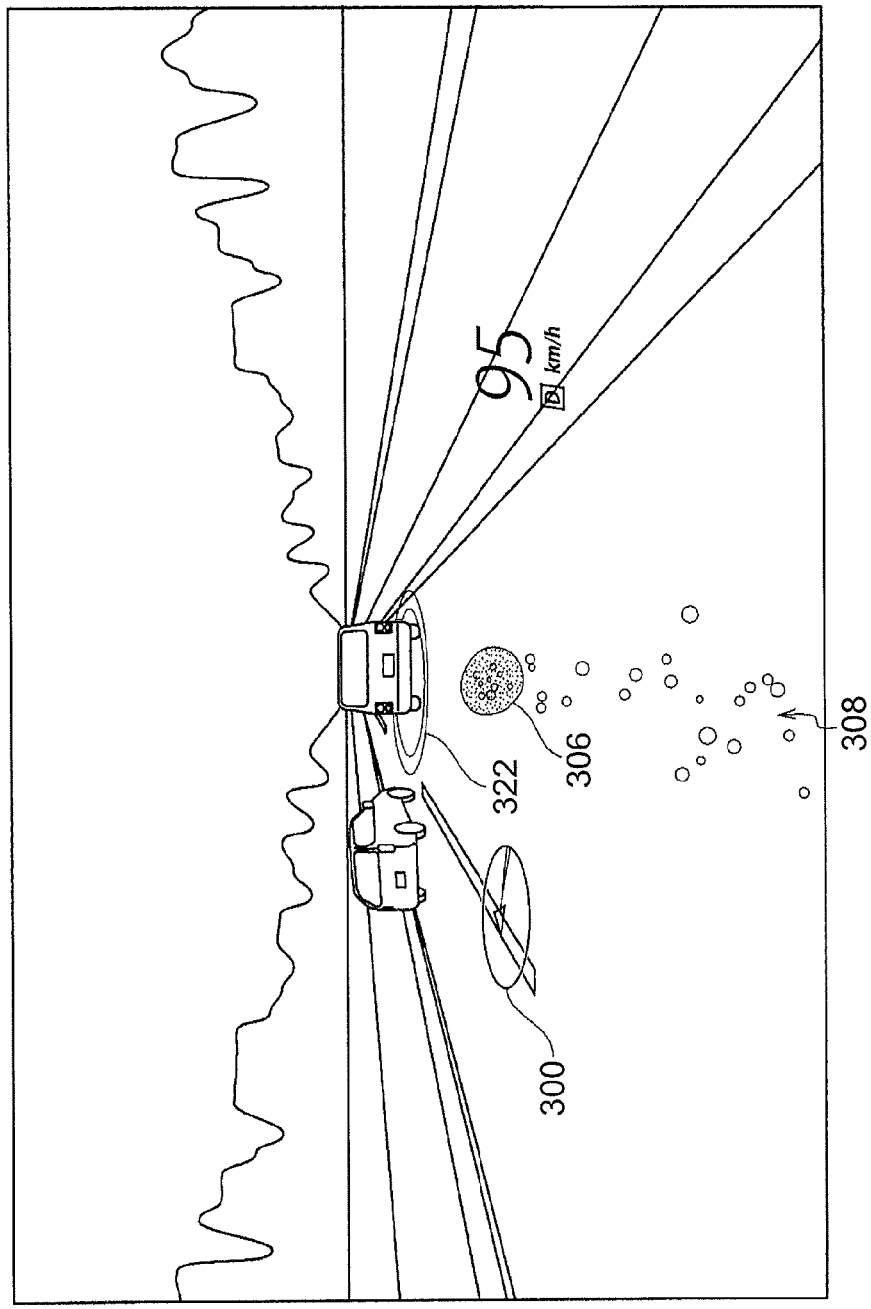
FIG. 25 is an image diagram showing an example of display on the HUD when a vehicle follows a preceding vehicle.

FIG. 25 shows an example of the following-target vehicle mark 322 displayed on the front windshield glass 88. The following-target vehicle mark 322 in this embodiment has the shape of an elliptic ring that surrounds the preceding vehicle. The display color of the following-target vehicle mark 322 is usually a color similar to the color of the first marker 306, but another color may also be used. The following-target vehicle mark 322 is displayed on the front windshield glass 88 as described above while the vehicle-following travel processing is performed during the automatic drive control processing by the automatic drive control unit 46. The following-target vehicle mark 322, displayed in this manner, allows the driver to recognize which vehicle is to follow. At the same time, the following-target vehicle mark 322 allows the driver to recognize that the vehicle-following travel processing is performed normally by the automatic drive control unit 46, giving the driver a sense of safety.

In step 196 that follows, the display control unit 62 inquires of the automatic drive control ECU 20 whether the automatic drive control processing by the automatic drive control unit 46 is to be terminated. In step 198 that follows, the display control unit 62 determines whether the automatic drive control processing by the automatic drive control unit 46 is to be terminated based on the inquiry result. If the determination in step 198 is negative, the automatic drive on-time information display processing is terminated. On the other hand, if the automatic drive control processing by the automatic drive control unit 46 is to be terminated, the determination in step 198 is affirmative and the processing proceeds to step 200. In step 200, the display control unit 62 displays the alert mark 310, which alerts the driver, on the front windshield glass 88 in the same manner as in step 134 described above (see FIGS. 26 and 28). This allows the attention of the driver, who visually recognizes the alert mark 310, to be directed to the predetermined position or an area near to that position.

In step 202, the display control unit 62 displays a message 324 (an example is shown in FIG. 27), which informs the driver about the termination of the automatic drive control processing by the automatic drive control unit 46, at a position on the front windshield glass 88 that is near to the display position of the first marker 306. Because the alert mark 310 is displayed as described above, the driver's attention is already directed to an area near to the display position of the first marker 306. Therefore, displaying the message 324 at a position, to which the driver's attention is directed, allows the driver to know smoothly that the automatic drive control processing by the automatic drive control unit 46 is terminated and therefore a driver's driving operation is required.

On the other hand, if the state of the vehicle and its surroundings is determined as the "hazard state" in step 182, the processing proceeds from step 182 to step 204. In step 204, the display control unit 62 performs the hazard-state-time processing. This hazard-state-time processing is described below with reference to FIG. 7.

As described above, the automatic drive control unit 46 determines whether the state of the vehicle and its surroundings is the "good state", "hazard state", or "failure state". If the state of the vehicle and its surroundings is the "hazard state", the automatic drive control unit 46 determines the hazard level of the state of the vehicle and its surroundings. In step 230 of the hazard-state-time processing, the display control unit 62 inquires of the automatic drive control ECU 20 about the hazard level of the state of the vehicle and its surroundings. In step 232, the display control unit 62 determines the hazard level of the state of the vehicle and its surroundings based on the inquiry result in step 230 and passes control to the corresponding step based on the determination result.

Figure 29:
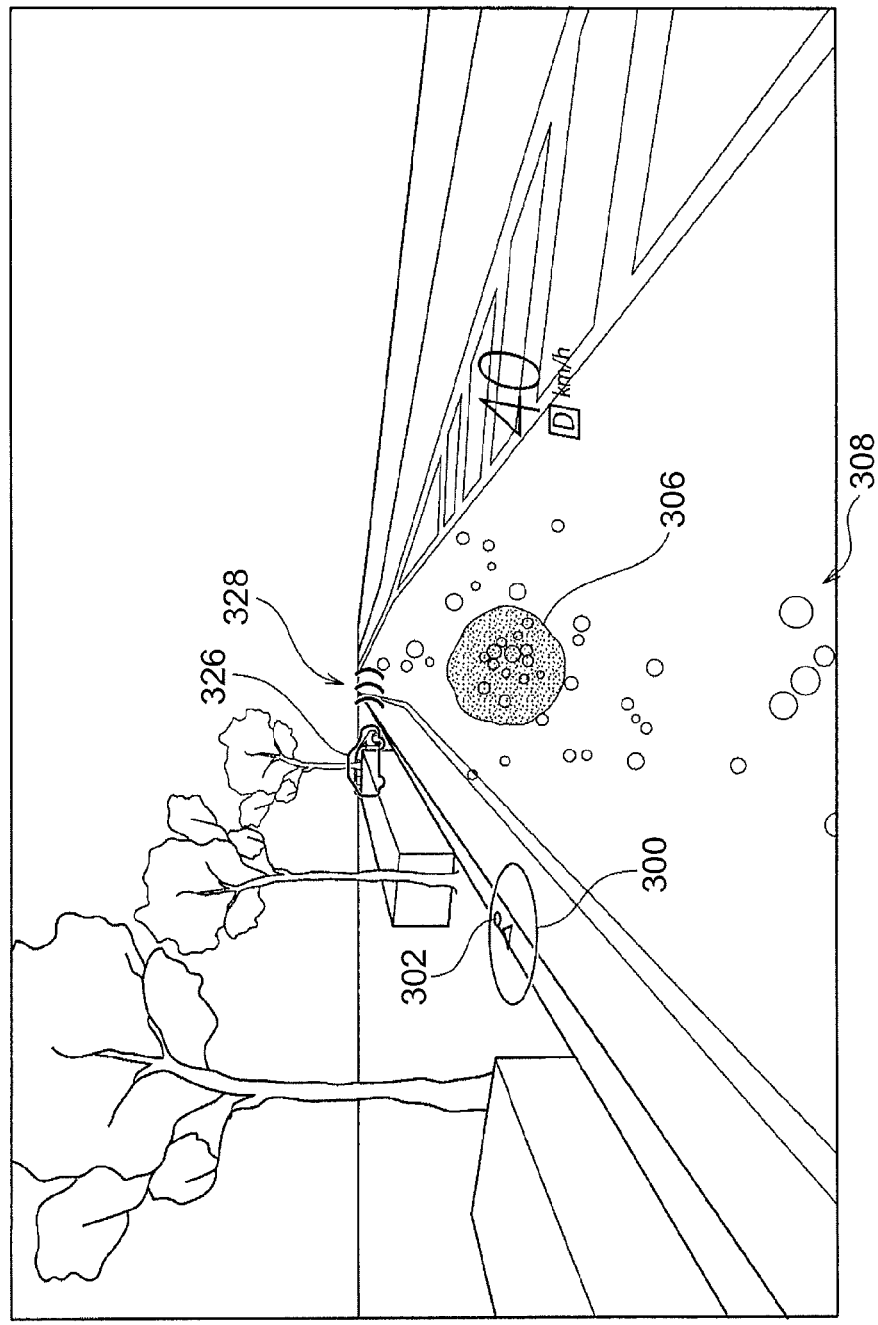
FIG. 29 is an image diagram showing an example of display on the display when a low-level hazard is generated.

If the hazard level of the state of the vehicle and its surroundings is the low level, the processing proceeds from step 232 to step 234. In step 234, the display control unit 62 additionally displays hazard notification marks on the front windshield glass 88. As an example of the case in which the hazard level is the low level, FIG. 29 shows the situation in which another vehicle is going to enter the road, on which the vehicle is traveling, from the left side. In the example in FIG. 29, a mark 326 that highlights the another vehicle and a mark 328 that indicates the traveling direction of the another vehicle are additionally displayed.

If the hazard level is the low level, the first marker 306 is displayed as in the other cases. The additionally displayed marks 326 and 328 allow the driver to recognize that there is a low-level hazard in the vehicle and its surroundings. After the processing in step 234 is performed, the processing proceeds to step 184 of the automatic drive on-time information display processing shown in FIG. 6.

If the hazard level of the state of the vehicle and its surroundings is the intermediate level, the processing proceeds from step 232 to step 236. In step 236, the display control unit 62 controls the HUD 76 to display the image of the second marker 314, which indicates that the state of the vehicle and its surroundings is the "hazard state", on the front windshield glass 88 in the same manner as in step 144 described above.

As described above, the display color of the second marker 314 in this embodiment is a color that allows the driver to intuitively understand that the state of the vehicle and its surroundings is the "hazard state", more specifically, a color such as yellow. The shape of the second marker 314 is a shape that allows the driver to intuitively understand that the state of the vehicle and its surroundings is the "hazard state", more specifically, a shape that has an irregular outline composed of a plurality of acute projections. In this case, though the shape of the second marker 314 changes slowly over time, the fluctuation in the shape of the second marker 314 in the image is controlled in such a manner that the second marker 314 maintains an irregular shape regardless of the change in the shape over time. In addition, after being displayed around the vehicle-corresponding position, the second marker 314 moves to the attention-required-location corresponding position at a speed higher than the speed of the fluctuation in the display position of the first marker 306. After that, the change in the display position of the second marker 314 in the image is controlled so that the display position will fluctuate.

The display described above allows the driver to visually recognize the second marker 314 displayed by the HUD 76 on the front windshield glass 88. This display alerts the driver so that the driver can intuitively understand the situation. In addition, the change in the display color, shape, and display position of the marker displayed on the front windshield glass 88, as well as the change in the speed of the movement of the marker to the display position, alert the driver. Therefore, the alert issued in this way can lead to a reduction in an excessive load on the driver that might otherwise be generated by an excessive display change that results in annoying the driver or by an excessive display change that results in transmitting too much information to the driver.

In step 238 that follows, based on the vehicle state information acquired from the automatic drive control ECU 20 in step 180 described above, the display control unit 62 determines whether the vehicle is traveling. If the determination in step 238 is negative, the hazard-state-time processing (automatic drive on-time information display processing) is terminated. If the determination in step 238 is affirmative, the processing proceeds to step 240. In step 240, the display control unit 62 displays the second-marker track mark 316, which indicates the movement track of the second marker 314 displayed on the front windshield glass 88, on the front windshield glass 88. Displaying the second-marker track mark 316 enables the driver, who visually recognizes the second-marker track mark 316, to recognize as if the second marker 314 was moving with the vehicle in the real space.

If the hazard level of the state of the vehicle and its surroundings is the high level (an example of "failure type is a predetermined type"), the processing proceeds from step 232 to step 242. In step 242, the display control unit 62 controls the HUD 76 to display the image of the second marker 314, which indicates that the state of the vehicle and its surroundings is the "hazard state", on the front windshield glass 88 in the same manner as in steps 144 and 236 described above. The second marker 314, which is displayed as described above, alerts the driver so that the driver can intuitively understand the situation and, at the same time, reduces the possibility that an excessive load will be imposed on the driver.

In step 244 that follows, the display control unit 62 determines whether the vehicle is traveling. If the determination in step 244 is negative, the processing proceeds to step 248. If the determination in step 244 is affirmative, the processing proceeds to step 246. In step 246, the display control unit 62 displays the second-marker track mark 316 on the front windshield glass 88. Displaying the second-marker track mark 316 enables the driver, who visually recognizes the second-marker track mark 316, to recognize as if the second marker 314 was moving with the vehicle in the real space.

If the hazard level of the state of the vehicle and its surroundings is the high level, the automatic drive control unit 46 terminates the automatic drive control processing in this embodiment. Therefore, in step 248, the display control unit 62 displays a message on the front windshield glass 88, indicating that the hazard level of the state of the vehicle and its surroundings is the high level and that the automatic drive control processing will be terminated. This message allows the driver to recognize that the automatic drive control processing by the automatic drive control unit 46 will be terminated and that the driver's driving operation will be required.

On the other hand, if a failure is occurred in the vehicle while the automatic drive control unit 46 is performing the automatic drive control processing, the state of the vehicle and its surroundings is determined as the "failure state (a failure is occurred in the vehicle)". In this case, in FIG. 6, the processing proceeds from step 182 to step 206. In step 206, the display control unit 62 controls the HUD 76 to display the image of the third marker 318, which indicates that the state of the vehicle and its surroundings is the "failure state", on the front windshield glass 88 in the same manner as in step 150 described above.

As described above, the display color of the third marker 318 in this embodiment is a color that allows the driver to intuitively understand that the state of the vehicle and its surroundings is the "failure state", more specifically, a color such as purple that implies a pale complexion. Unlike the first marker 306 and the second marker 314, the third marker 318 has an indeterminate shape. In the image displayed on the front windshield glass 88, the fluctuation in the shape of the third marker 318 in the image is controlled in such a manner that the amount of change in the shape becomes larger than the amount of change in the shape of the first marker 306 and the second marker 314. In addition, the third marker 318 is displayed near the vehicle-corresponding position. This display gives the driver an impression that the state of the vehicle and its surroundings is the "failure state". The third marker 318 displayed as described above also prevents an excessive display change from annoying the driver and reduces the possibility that an excessive load will be imposed on the driver.

In step 208 that follows, the display control unit 62 determines whether the vehicle is traveling. If the determination in step 208 is negative, the processing proceeds to step 212. If the determination in step 208 is affirmative, the processing proceeds to step 210. In step 210, the display control unit 62 displays the third-marker track mark 320 on the front windshield glass 88. As described above, this display method gives the driver, who visually recognizes the third-marker track mark 320, a strong impression that the state of the vehicle and its surroundings is the "failure state".

In step 212 that follows, the display control unit 62 displays the alert mark 310, which alerts the driver, on the front windshield glass 88 in the same manner as in step 156 described above. Displaying this message allows the attention of the driver, who visually recognizes the alert mark 310, to be directed to the position, where the alert mark 310 is displayed, or to an area near to that position.

If the state of the vehicle and its surroundings is determined as the "failure state", the automatic drive control unit 46 terminates the automatic drive control processing in this embodiment. Therefore, in step 214 that follows, the display control unit 62 displays a message (not shown), which informs that the automatic drive control processing will be terminated due to the occurrence of a failure, at a position on the front windshield glass 88 that is near to the display position of the third marker 318. Because the alert mark 310 is displayed as described above, the driver's attention is already directed to an area near to the display position of the third marker 318. Therefore, displaying the above-described message at a position, to which the driver's attention is directed, allows the driver to recognize that the automatic drive control processing by the automatic drive control unit 46 will be terminated and that the driver's driving operation will be required.

Although the automatic drive control ECU 20, which performs the automatic drive control processing, and the display control ECU 22, which performs the display control processing, are separately provided in the mode described above, the present invention is not limited to this configuration. A configuration may also be used in which one ECU performs both the automatic drive control processing and the display control processing.

In the above description, though the mode is described in which the first marker 306, second marker 314, or third marker 318 is displayed on the front windshield glass 88 regardless of whether the automatic drive control processing is performed by the automatic drive control unit 46, the present invention is not limited to this mode. For example, the mode in which the first marker 306, second marker 314, or third marker 318 is displayed on the front windshield glass 88 only when the automatic drive control processing is performed by the automatic drive control unit 46 and the mode in which the first marker 306, second marker 314, or third marker 318 is displayed for a predetermined time and then erased when the automatic drive control processing is not performed by the automatic drive control unit 46 are included in the scope of the present invention.

In the above description, though the mode of automatic drive control processing that does not require a driver's driving operation is described as the drive assist processing that assists an occupant in driving the vehicle, the present invention is not limited to this mode. The present invention is applicable also to the mode of processing that assists the driver in the driving operation and cooperates with the driver in driving the vehicle.

In the above description, though the automatic drive control processing is performed when the automatic drive control unit 46 determines that the automatic drive control processing can be performed, the present invention is not limited to this mode. The present invention is applicable also to the mode in which the automatic drive control processing can always be performed by the automatic drive control unit 46.

In the above description, though the display control program 70, an example of the control program of the in-vehicle device according to the present invention, is stored (installed) in advance in the storage unit 68, the control program of the in-vehicle device according to the present invention may also be provided as a form stored in a storage medium such as a CD-ROM or a DVD-ROM.

What is claimed is:

1. An in-vehicle device comprising:
a drive assist electronic control unit configured to perform drive assist processing that assists an occupant in driving a vehicle;
a display unit configured to display an image in a display area with the image overlapped on a scene in a real space ahead of the vehicle; and
a display electronic control unit configured to control the display unit to display, in a normal state while the drive assist processing is performed by the drive assist electronic control unit, an image of a first marker at a vehicle-corresponding position as a position in the display area corresponding to a position where the vehicle is estimated to be positioned in the real space in a predetermined time, wherein
the first marker has a first color,
the first marker has a first shape that has a smooth outline and fluctuates, and
a display position of the first marker varies periodically from the vehicle-corresponding position.

2. The in-vehicle device according to claim 1, wherein:
the display electronic control unit is configured to control the display unit to display an image of a second marker when there is a need to issue an alert to the occupant;
the second marker has a second color that differs from the first color;
the second marker has a second shape that differs from the first shape; and
a display position of the second marker moves from the vehicle-corresponding position to a position in the display area corresponding to a location where an attention of the occupant is required, at a speed higher than a speed at which the display position of the first marker varies.

3. The in-vehicle device according to claim 2, wherein the second shape has an outline composed of a plurality of acute projections.

4. The in-vehicle device according to claim 2, wherein:
the display electronic control unit is configured to control the display unit to display an image of a third marker when a failure is occurred in the drive assist electronic control unit or in the drive assist processing performed by the drive assist electronic control unit;
the third marker has a third color that differs from the first color and the second color; and
the third marker has a third shape that differs from the first shape and the second shape and that changes indeterminately.

5. The in-vehicle device according to claim 4, wherein the display electronic control unit is configured to control the display unit to display a message indicating termination of the drive assist processing and erase the display of the third marker, when a type of the occurred failure is a predetermined type.

6. The in-vehicle device according to claim 4, wherein the display electronic control unit is configured to control the display unit to display, while the vehicle is traveling, a track mark that indicates a movement track of the third marker.

7. The in-vehicle device according to claim 6, wherein the display electronic control unit is configured to control the display unit to display, as the track mark, a plurality of marks arranged in such a manner that the marks are continuously flowing from the third marker into an area in the display area corresponding to a road surface in the real space.

8. The in-vehicle device according to claim 2, wherein the display electronic control unit is configured to control the display unit to display, while the vehicle is traveling, a track mark that indicates a movement track of the second marker.

9. The in-vehicle device according to claim 8, wherein the display electronic control unit is configured to control the display unit to display, as the track mark, a plurality of marks arranged in such a manner that the marks are continuously flowing from the second marker into an area in the display area corresponding to a road surface in the real space.

10. The in-vehicle device according to claim 1, wherein the display electronic control unit is configured to control the display unit to display, while the vehicle is traveling, a track mark that indicates a movement track of the first marker.

11. The in-vehicle device according to claim 10, wherein the display electronic control unit is configured to control the display unit to display, as the track mark, a plurality of marks arranged in such a manner that the marks are continuously flowing from the first marker into an area in the display area corresponding to a road surface in the real space.

12. The in-vehicle device according to claim 1, wherein the display electronic control unit is configured to control the display unit to display an alert mark that alerts the occupant, when a simple alert is issued to the occupant or a message to the occupant is displayed.

13. The in-vehicle device according to claim 12, wherein the display electronic control unit is configured to control the display unit to display, as the alert mark, a plurality of marks arranged in such a manner that the marks are scattered from a predetermined position into a surrounding area of the predetermined position.

14. The in-vehicle device according to claim 1, wherein:
the drive assist electronic control unit is configured to perform, as the drive assist processing, vehicle-following processing in which the vehicle is controlled to follow a specific vehicle that is traveling ahead of the vehicle in the same direction as a direction of the vehicle; and
the display electronic control unit is configured to control the display unit to display, while the vehicle-following processing is performed by the drive assist electronic control unit, a following-target vehicle mark indicating that the specific vehicle is a following target vehicle at a position in the display area corresponding to a position of the specific vehicle in the real space.

15. The in-vehicle device according to claim 1, wherein the display electronic control unit is configured to control the display unit to display, when the vehicle makes one of a lane change and a right or left turn, a direction mark indicating a direction in which the vehicle is to make the one of the lane change and the right or left turn.

16. The in-vehicle device according to claim 1, further comprising a surrounding situation acquisition unit configured to acquire a surrounding situation around the vehicle, wherein
the display electronic control unit controls the display unit to display a surrounding situation diagram that indicates the surrounding situation around the vehicle based on the surrounding situation around the vehicle, acquired by the surrounding situation acquisition unit.

17. A control method for an in-vehicle device including a drive assist electronic control unit configured to perform drive assist processing that assists an occupant in driving a vehicle and a display unit configured to display an image in a display area with the image overlapped on a scene in a real space ahead of the vehicle, the control method comprising
controlling the display unit to display, in a normal state while the drive assist processing is performed by the drive assist electronic control unit, an image of a first marker at a vehicle-corresponding position as a position in the display area corresponding to a position where the vehicle is estimated to be positioned in the real space in a predetermined time, wherein
the first marker has a first color,
the first marker has a first shape that has a smooth outline and fluctuates, and
a display position of the first marker varies periodically from the vehicle-corresponding position.

18. A non-transitory computer-readable storage medium that stores computer-executable instructions for performing a control method for an in-vehicle device including a drive assist electronic control unit configured to perform drive assist processing that assists an occupant in driving a vehicle and a display unit configured to display an image in a display area with the image overlapped on a scene in a real space ahead of the vehicle, the control method comprising
controlling the display unit to display, in a normal state while the drive assist processing is performed by the drive assist electronic control unit, an image of a first marker at a vehicle-corresponding position as a position in the display area corresponding to a position where the vehicle is estimated to be positioned in the real space in a predetermined time, wherein
the first marker has a first color,
the first marker has a first shape that has a smooth outline and fluctuates, and
a display position of the first marker varies periodically from the vehicle-corresponding position.

* * * * *